United States Patent [19]
Yanagihara et al.

[11] Patent Number: 5,880,941
[45] Date of Patent: Mar. 9, 1999

[54] DIGITAL VIDEO SIGNAL RECORDING/ REPRODUCING APPARATUS FOR STORING A VERTICAL RESOLUTION SIGNAL

[75] Inventors: Naofumi Yanagihara; Masahiko Sato; Masaki Oguro, all of Tokyo; Keiji Kanota, Kanagawa, all of Japan

[73] Assignee: Sony Corporation, Tokyo, Japan

[21] Appl. No.: 574,640

[22] Filed: Dec. 19, 1995

[30] Foreign Application Priority Data

| Dec. 22, 1994 | [JP] | Japan | 6-336505 |
| Jan. 27, 1995 | [JP] | Japan | 7-031686 |
| May 30, 1995 | [JP] | Japan | 7-155381 |

[51] Int. Cl.$^6$ .............................. H04N 9/79; H04N 7/08
[52] U.S. Cl. ................... 386/1; 386/37; 386/40; 348/474; 348/429
[58] Field of Search .................. 386/1, 11, 26, 386/37, 40, 95, 131; 348/464, 466, 476, 477, 478, 479, 705, 441, 443, 445, 474, 429, 453; H04N 5/92, 7/01, 7/10, 7/80, 7/87, 11/00, 11/20, 9/79

[56] References Cited

U.S. PATENT DOCUMENTS

| 4,845,562 | 7/1989 | Koslov et al. | 358/141 |
| 4,879,606 | 11/1989 | Walter et al. | 358/330 |
| 4,933,765 | 6/1990 | Schiff et al. | 358/141 |
| 5,025,309 | 6/1991 | Isnardi | 358/12 |
| 5,055,916 | 10/1991 | Dieterich | 358/12 |
| 5,067,018 | 11/1991 | Sakamoto et al. | 358/142 |
| 5,264,920 | 11/1993 | Suesada et al. | 358/12 |
| 5,268,751 | 12/1993 | Geiger et al. | 358/12 |
| 5,293,248 | 3/1994 | Bergen et al. | 358/330 |
| 5,305,104 | 4/1994 | Jensen et al. | 348/473 |
| 5,309,234 | 5/1994 | Kranawetter et al. | 348/473 |
| 5,394,197 | 2/1995 | Kim | 348/708 |
| 5,438,368 | 8/1995 | Hutter | 348/434 |
| 5,510,847 | 4/1996 | Nio et al. | 348/554 |
| 5,557,336 | 9/1996 | Nakajima | 348/556 |

OTHER PUBLICATIONS

N. Suzuki et al., "Multiplexing Scheme of Helper Signals on Bars in EDTV–II", IEE International Broadcasting Convention, Conference Publication No. 397, Sep. 16, 1994.

D. Brockhurst et al., "A Prototype Codec", IEE Colloquium, Digest No.: 1994/090, pp. 3/1–3/6, Apr. 12, 1994.

*Primary Examiner*—Andrew Faile
*Assistant Examiner*—Aung S. Moe
*Attorney, Agent, or Firm*—William S. Frommer; Alvin Sinderbrand

[57] ABSTRACT

The television signal recording/reproducing system digitally records and reproduces television signals composed of a luminance signal, a chrominance signal and a resolution compensation signal included in predetermined television scanning lines. The system includes a Y/C separating circuit for separating the luminance signal Y from the chrominance signal C and a decoder for decoding the color signal into color difference signals $C_B, C_R$. One of the color difference signals $C_B, C_R$ is combined with the resolution compensation signal, and a digital video signal recorder digitally records the combined resolution signal and the color difference signal. In this manner, the resolution compensation signal is accurately recorded.

45 Claims, 46 Drawing Sheets

PAL PLUS RECEIVER

PAL PLUS VIDEO PICTURE

CONVENTIONAL RECEIVER

LINE 60,61,62,271,272,273,274, & LINE 372,373,374,583,584,585,586

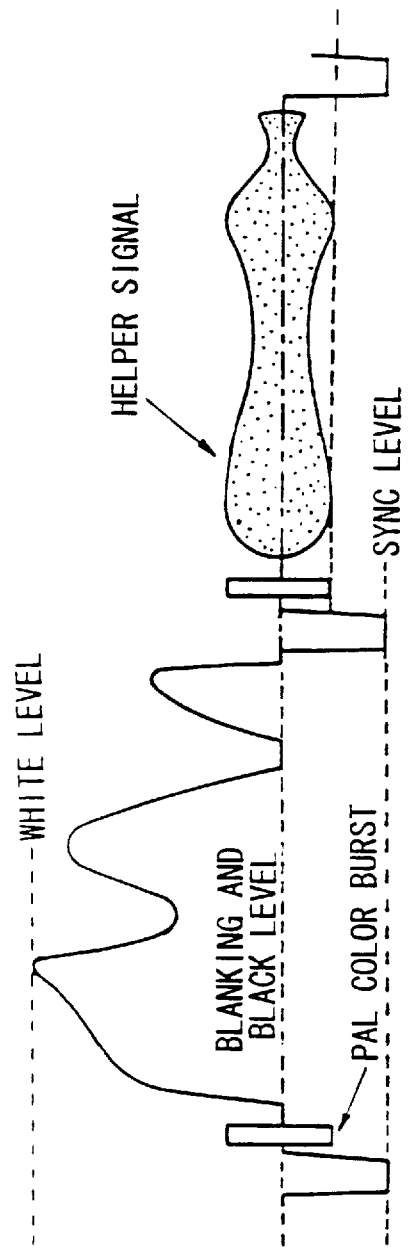

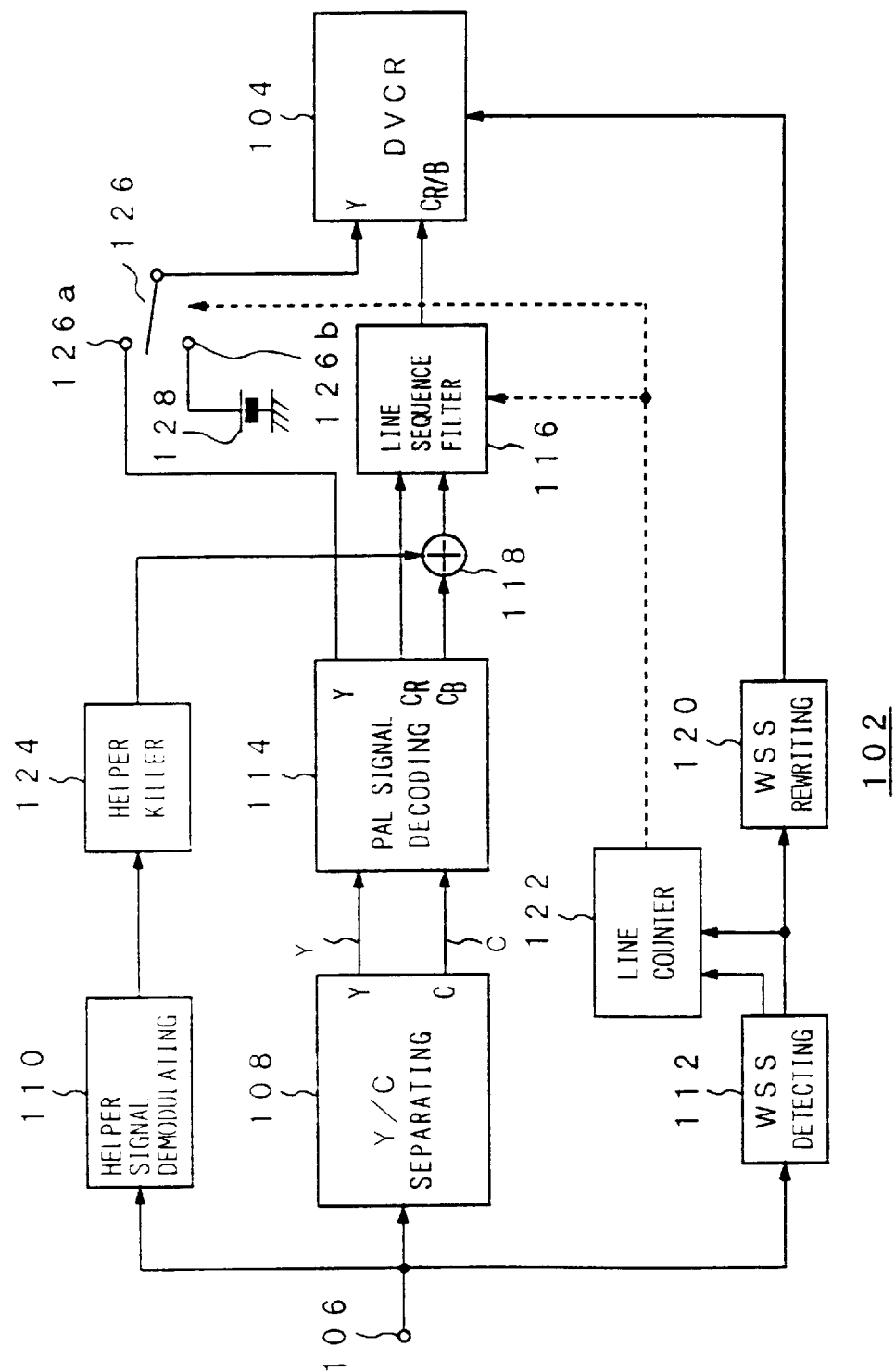

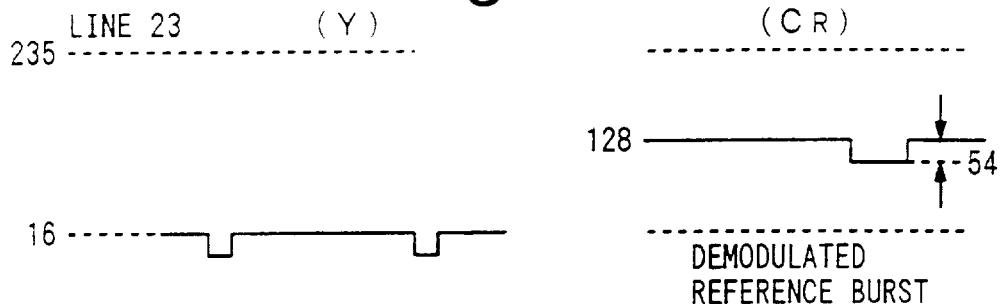
Fig. 8A
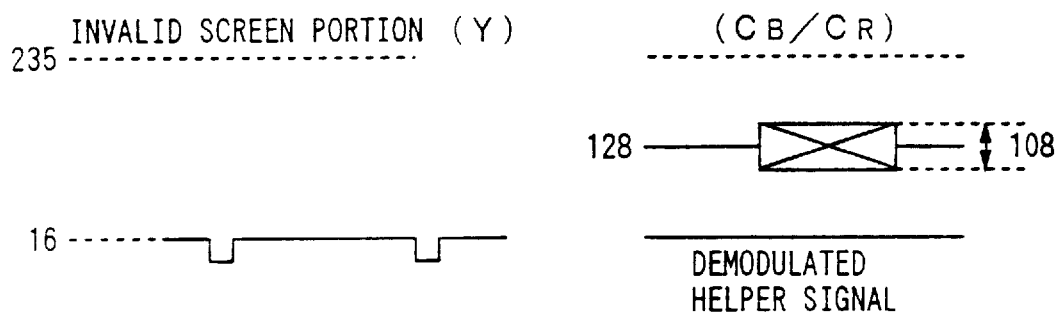
Fig. 8B
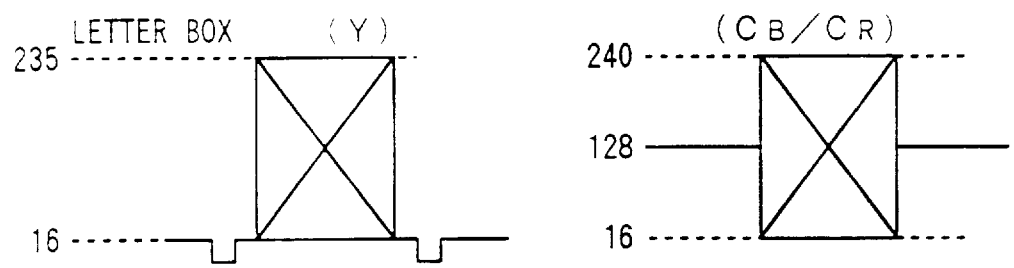
Fig. 8C
Fig. 8D
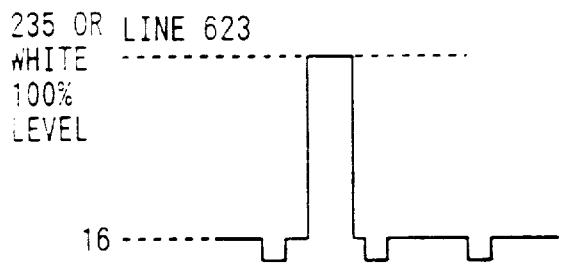

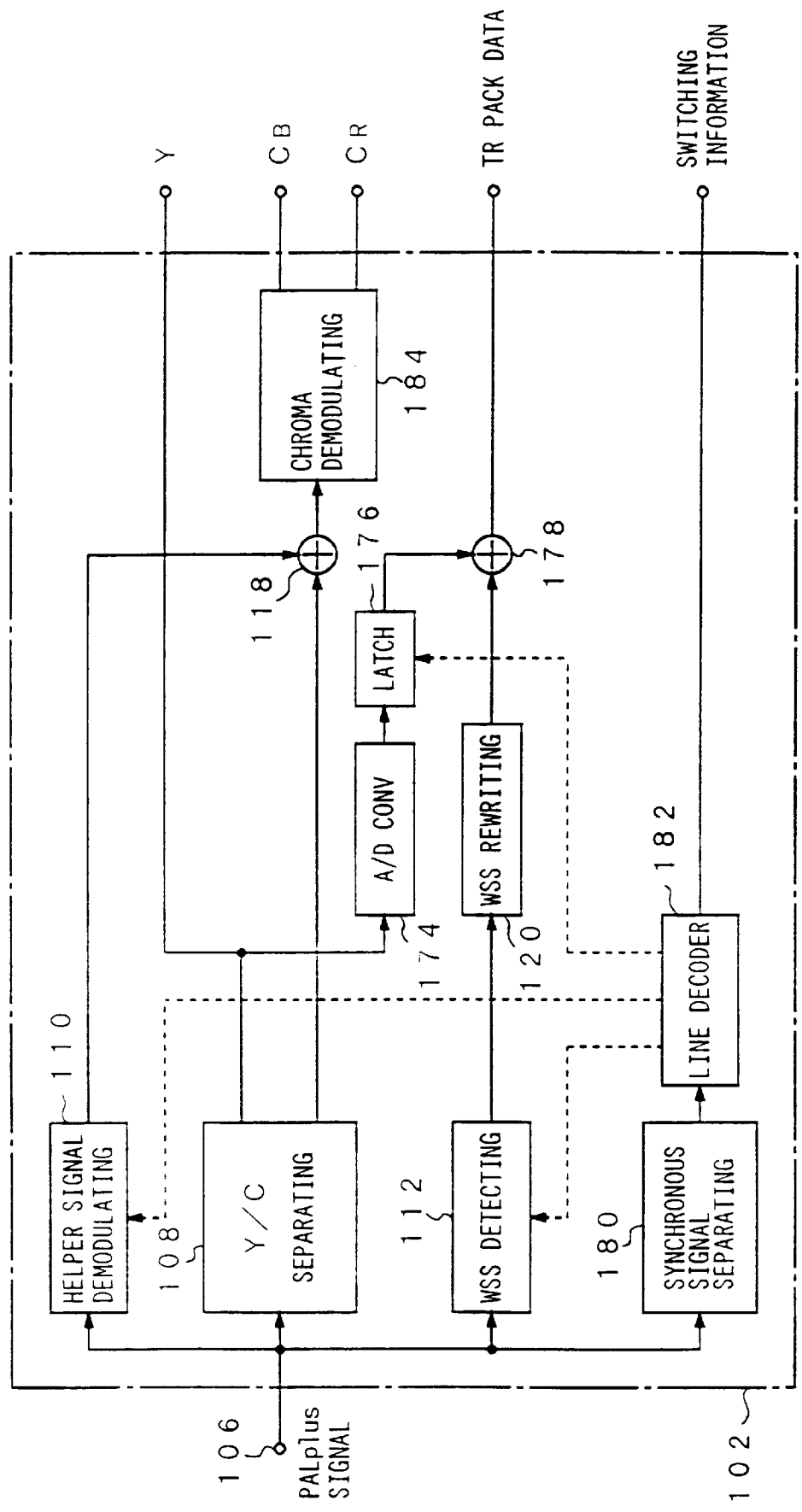

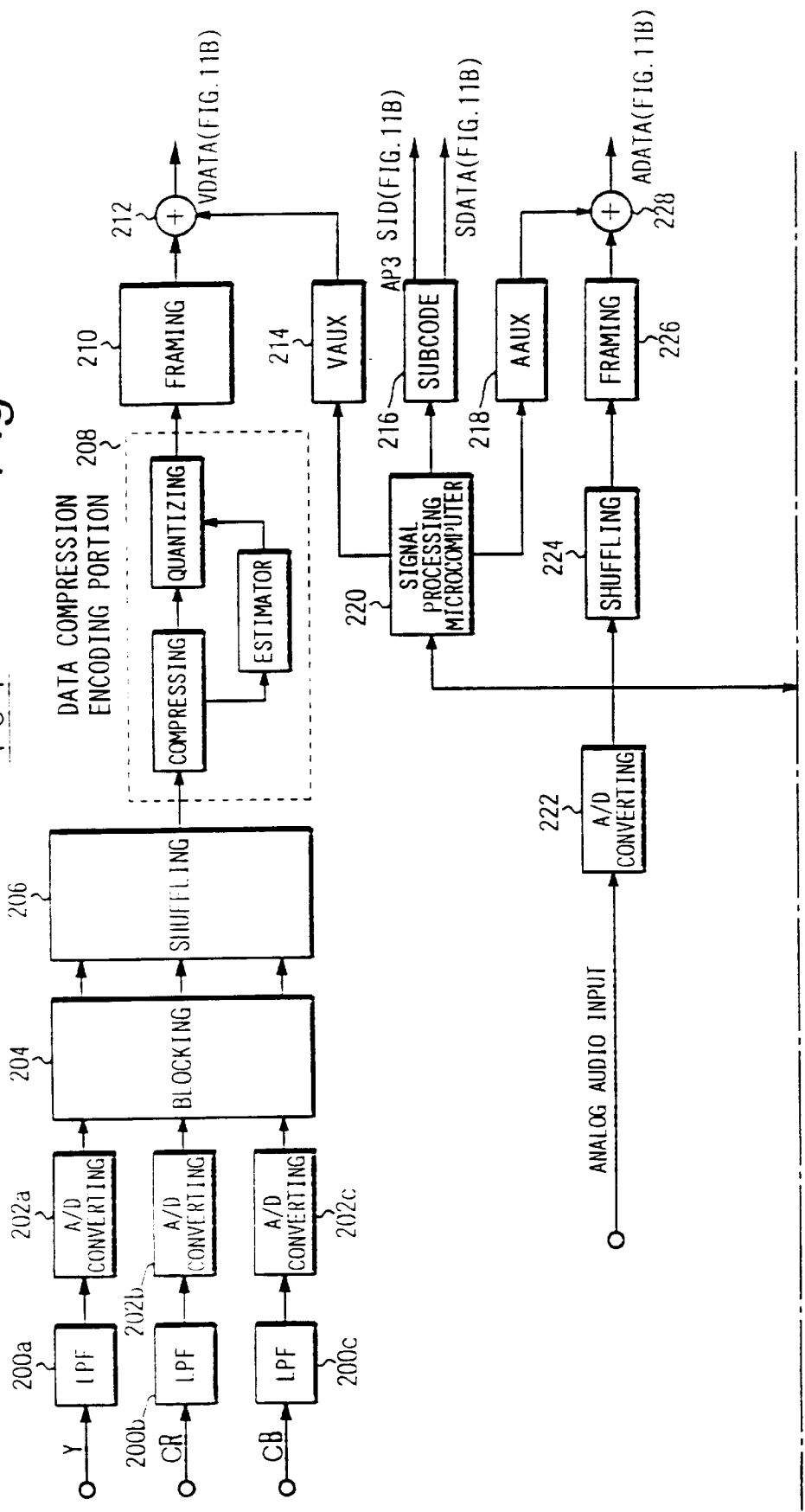

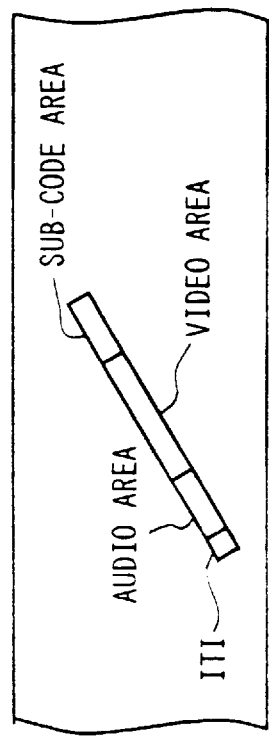

| WORD NAME | MSB | LSB |
|---|---|---|
| P C 0 | HEADER | |
| P C 1 | | |
| P C 2 | DATA | |
| P C 3 | | |
| P C 4 | | |

Fig. 21A

| PC0 | 0 | 1 | 1 | 0 | 0 | 1 | 1 | 0 |
|---|---|---|---|---|---|---|---|---|
| PC1 | ----------→ LSB | | | | DATA TYPE | | | |
| PC2 | ---------- DATA ---------- | | | | | | | |
| PC3 | ---------- (UP TO 28 BITS) ---------- | | | | | | | |
| PC4 | ←---------- MSB | | | | | | | |

DATA TYPE:
```
0000 = VBID
0001 = WSS
0010 = EDTV-2 ID ON LINE 22
0011 = EDTV-2 ID ON LINE 285
0100 = NO INFORMATION
OTHERS = NOT DEFINED
```

Fig. 21B

| PC0 | 0 | 1 | 1 | 0 | 0 | 1 | 1 | 0 |
|---|---|---|---|---|---|---|---|---|
| PC1 | ----------→ LSB | | | | DATA TYPE | | | |
| PC2 | ---------- WSS DATA ---------- | | | | | | | |
| PC3 | 1 | 1 | 1 | 1 | 1 | 1 | ←MSB | |
| PC4 | 1 | 1 | 1 | 1 | 1 | 1 | 1 | 1 |

Fig. 21C

| PC0 | 0 | 1 | 1 | 0 | 0 | 1 | 1 | 0 |
|-----|---|---|---|---|---|---|---|---|
| PC1 | -------------→ LSB | | | | 0 | 0 | 0 | 1 |
| PC2 | ------------- WSS DATA ------------- | | | | | | | |
| PC3 | 1 | 1 | 1 | 1 | 1 | 1 | ←------- MSB | |
| PC4 | WHITE 100% REFERENCE | | | | | | | |

Fig. 22A

| | MSB | | | | | | | LSB |
|---|---|---|---|---|---|---|---|---|
| PC0 | 0 | 1 | 1 | 0 | 0 | 0 | 0 | 0 |
| PC1 | TENS OF TV CHANNEL | | | | UNITS OF TV CHANNEL | | | |
| PC2 | B/W | EN | CLF | | HUNDREDS OF TV CHANNEL | | | |
| PC3 | SOURCE CODE | | 50/60 | | STYPE | | | |
| PC4 | TUNER CATEGORY | | | | | | | |

Fig. 22B

| | MSB | | | | | | | LSB |
|---|---|---|---|---|---|---|---|---|
| PC0 | 0 | 1 | 1 | 0 | 0 | 0 | 0 | 1 |
| PC1 | RESERVED | | | | | | | |
| PC2 | REC ST | 1 | REC MODE | | 1 | DISP | | |
| PC3 | FF | FS | FC | IL | ST | SC | BCSYS | |
| PC4 | · | GENRE CATEGORY | | | | | | |

PRE-SYNC BLOCK

POST-SYNC BLOCK

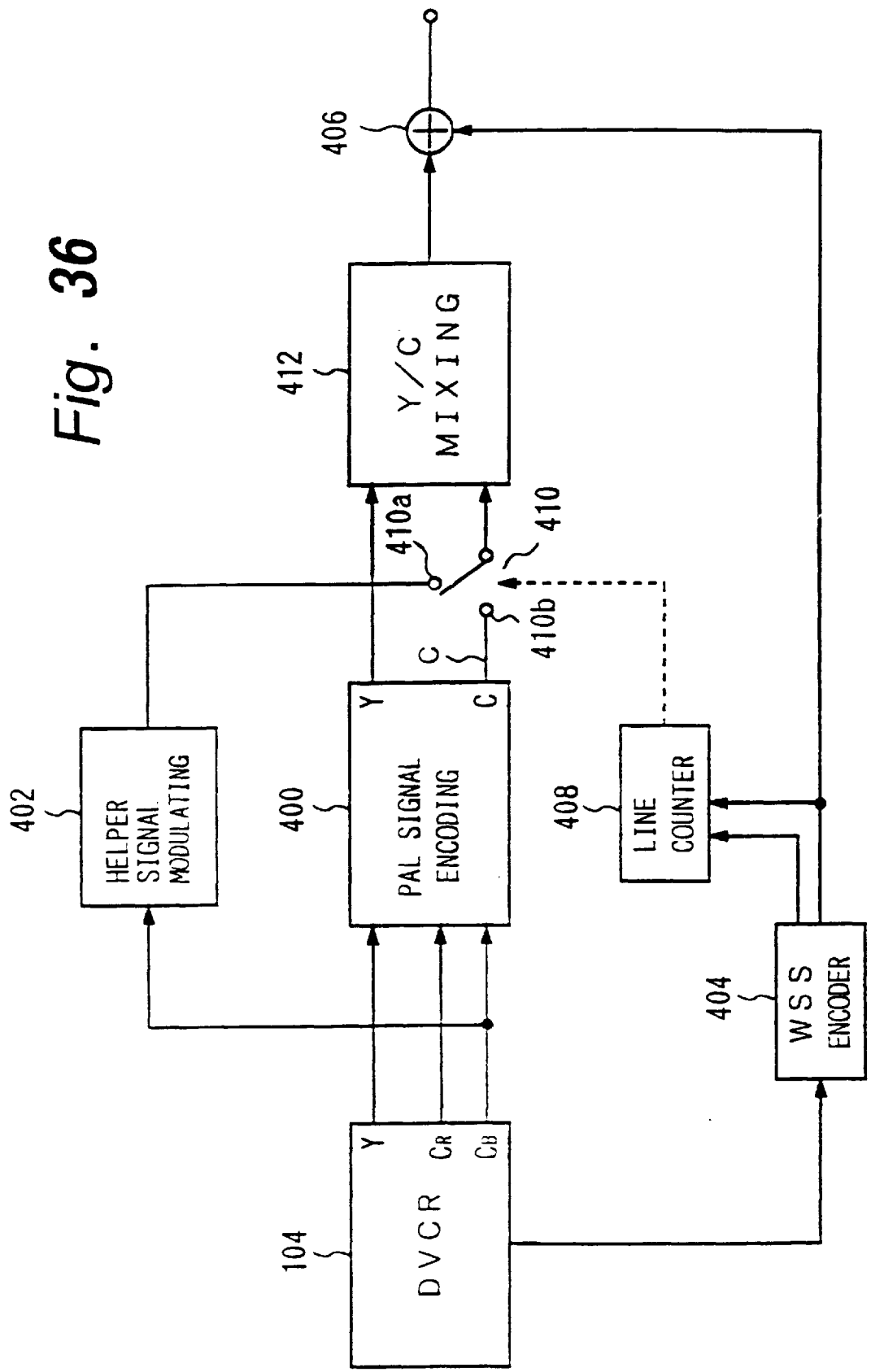

DIGITAL VIDEO SIGNAL RECORDING/ REPRODUCING APPARATUS FOR STORING A VERTICAL RESOLUTION SIGNAL

BACKGROUND OF THE INVENTION

The present invention relates to digital video signal recording/reproducing and, more particularly, to digitally recording/reproducing a vertical resolution signal of a video picture as a color signal. Reference is made to copending application Ser. No. (to be assigned), filed Nov. 3, 1995 (attorney docket 450100-3367, which describes related subject matter.

Video signals are transmitted from a transmission source to a television and are reconstructed by the television into a video picture. A video signal is comprised of different types of signals, such as information signals describing how the video picture is arranged and data signals corresponding to the actual video picture. Video signals are transmitted to televisions in a standard format so that a television can identify the different signals and process them into a video picture.

The PAL plus standard is one such format employed particularly in European countries and is becoming more popular in the United States. The success of the PAL plus standard is due in part to the movie-screen shape of a PAL plus video picture shown in FIG. 1A. With a PAL plus television, viewers can watch a movie in the comfort of their own home with all of the enjoyment of watching the video picture on a movie-theater screen.

The ratio between the width and the height of the video picture is known as the aspect ratio. The PAL plus standard has a 16:9 aspect ratio, which means that the width is almost twice as large as the height of the PAL plus video picture. By comparison, the NTSC television screen in FIG. 1B (the PAL plus video picture superimposed) has a significantly larger aspect ratio than the NTSC screen. That is, the NTSC screen is shaped more like a square than the rectangular, PAL plus video picture.

With the digital compression era, video picture standards are being modified to include digital compression. The PAL plus standard is one such modified version which grew out of the earlier PAL standard. The digital compression in the PAL plus standard is a 4 to 3 decimation, and as shown in FIG. 1C, compresses four lines of the video picture into three lines. The resulting compressed video picture can be thought of as having an upper screen portion, a middle main screen portion and a lower invalid screen portion.

Since the invalid screen portions do not carry video picture data, the PAL plus standard uses these portions to transmit information relating to the video picture. Such information includes a vertical resolution signal, known as a helper signal, which is generated by decimating the video picture using a 4 to 1 decimation process. The helper signal is used during decompression to reconstruct the vertical resolution of the PAL plus video picture.

FIG. 2A is a more detailed depiction of the decimated PAL plus video picture with the first field (lines 60 to 274) corresponding to a luminance signal Y component, and the second field (lines 372 to 586) corresponding to a color difference signal $C_B, C_R$ component (FIG. 3). During the transmission of lines 1 to 22, 311 to 335 and 623 to 624, no signals are transmitted and the television executes a vertical blanking operation; whereby the electron scanning beam is turned off and reset to the upper-left corner of the television screen. Similarly, during the transmission of samples 1 to 9 and 712 to 731, the television executes a horizontal blanking operation and the electron scanning beam is reset to the next line. WSS bits which indicate that a helper signal is forthcoming are located at the beginning of the video picture on line 23. A reference signal which is used to decode the helper signal follows the WSS bits on line 23. Then, the helper signal is transmitted during lines 24 to 59, which correspond to the upper invalid screen portion. The main screen portion is transmitted during lines 60 to 274, wherein the data making up the video picture is transmitted. Finally, another portion of the helper signal is transmitted during lines 274 to 310, thus completing transmission of field 1. Field 2 (lines 336 to 623 is transmitted in a similar fashion to field 1.

The PAL plus standard ascribes to a 4:2:2 ($Y:C_R:C_B$) sampling scheme corresponding to Recommendation 601 of CCIR (International Radio Consultative Committee; now, ITU-RS). In other words, for every four samples, the luminance signal Y is sampled four times and the color difference signals $C_B, C_R$ are each sampled twice. Thus, the luminance samples signal Y are stored in field 1, while the color difference signals are "doubled-up" and stored together in field 2, as shown in FIG. 2A.

While the PAL plus signal is depicted as a picture in FIG. 2A, the PAL plus signal is transmitted as the stream of data depicted in FIG. 4A. Valid lines 23 to 622 are by sync pulses and each line is separated by horizontal sync pulses. The PAL plus signal begins at line 23 and is shown with the WSS signal and the reference of the helper signal; and ends at line 622. The vertical blanking interval begins at line 623 and includes the white 100% reference level, which indicates the value corresponding to a 100% white portion of the video picture. An analog signal corresponding to the video picture transmitted during the main portions of the PAL plus signal is shown in FIG. 4B. Following the video signal, the helper signal is shown as an analog signal. FIG. 4C shows line 23 in more detail with the WSS signal arranged as a series of bits. FIG. 4D shows line 623 in more detail of the PAL plus signal, wherein the white 100% level reference has a maximum value of 235 and a pedestal is set to 16.

As shown in FIG. 2B, another video picture standard is the EDTV-2 video picture which has a similar configuration to the PAL plus video picture shown in FIG. 2A. As shown, the EDTV-2 video picture has two fields with each field having upper and lower invalid portions and a middle valid portion. The upper and lower invalid portions are multiplexed with vertical resolution signals VT and VH and the middle valid portion is multiplexed with a horizontal resolution signal HH. The VT signal is a vertical time high-band component that is lost in the interlace process when a video signal photographed in the double speed non-interlace mode is transmitted by the interlace mode; and the VH signal is a vertical luminance high-band component that is lost when a video signal with an aspect ratio of 16:9 is formed by decimation into the letter box shape. The HH signal is a horizontal luminance high-band component with a band ranging from 4.2 MHz to 6 MHz and is frequency shifted and multiplexed to the Fukinuki hole (an area in the vertical/temporal frequency domain where the color signals are not located) of the main screen portion. Thus, data in the vertical blanking interval and the horizontal blanking interval is omitted while lines 23 to 232 of a field 1 and lines 285 to 524 of a field 2 are encoded.

Similar to the PAL plus system, EDTV-2 also includes reference signals. NRZ signals (B1 to B4) that represent an aspect ratio are disposed on lines 22 and 285. Identification (ID) signals are disposed that represent whether or not signal components of VT, VH, and HH are present (the ID signals are modulated with a color sub-carrier and identify whether the signal components VT, VH, and HH are present depending upon whether the phase of the modulated signals are phase 0 or in phase with the color sub-carrier). Lastly, a 2.04 MHz confirmation signal that identifies the video signal as a signal corresponding to the EDTV-2 standard is disposed.

A problem arises when a resolution compensation signal is digitally recorded by a digital VCR. As shown in FIG. 5, the luminance Y signal has a bandwidth of approximately 5 MHz and a center frequency of about 2.25 MHz. The chrominance signal C, by contrast, has a smaller bandwidth of about one MHz. The helper signal shown in FIG. 5B has the same center frequency as the chrominance signal C, but has a bandwidth which is within the range of the luminance signal Y. When the helper signal in the first field of the PAL plus video signal is processed as a color signal C the helper signal is truncated because the bandwidth of the chrominance signal C (one MHz) is significantly smaller than the helper signal (five MHz). Thus, the helper signal has not been, heretofore, properly processed and stored on digital media.

OBJECTS OF THE INVENTION

Therefore, it is an object of the present invention to provide a digital video signal recording/reproducing apparatus for storing a vertical resolution signal.

Another object of the present invention is to provide a digital video signal recording/reproducing apparatus that processes the vertical resolution signal as a chrominance signal C.

A further object of the present invention is to provide a digital video signal recording/reproducing apparatus for storing the vertical resolution signal on a digital medium as a chrominance signal C.

Other objects, features, and advantages of the present invention will become apparent from the following detailed description.

SUMMARY OF THE INVENTION

In accordance with the above objects, the present invention is embodied as a digital video signal recording apparatus, which digitally records a composite signal. The composite signal is composed of a luminance signal, a chrominance signal, and a resolution compensation signal that are positioned at predetermined television scanning lines. A Y/C separator separates the luminance signal and the chrominance signal from the composite signal and a decoder further decodes the color signal into color difference signals $C_B, C_R$. A combiner combines the resolution compensation signal with one of the color difference signals $C_B, C_R$. A digital video signal recorder digitally records the combined signal onto the record medium.

The invention is also embodied as a television signal reproducing apparatus, which digitally reproduces a composite signal. A digital reproducer reproduces a component signal, which includes a color difference signal combined with a resolution compensation signal, from a record medium. A separator separates the color difference signal from the resolution component signal and an encoder encodes the color difference signals $C_B, C_R$ into a color signal.

The invention is also embodied as a method of recording and reproducing composite signals. In the recording method, the luminance signal and the chrominance signal are separated and the chrominance signal is further decoded into color difference signals $C_B, C_R$. The resolution compensation signal is combined with one of the color difference signals and digitally recorded onto a recording medium. In the reproducing method, the component signal is reproduced from the record medium; and the resolution compensation signal is separated from the color difference signal. The color difference signals then are encoded into a chrominance signal and combined with the resolution component signal.

BRIEF DESCRIPTION OF THE DRAWINGS

A more complete appreciation of the present invention and many of its attendant advantages will be readily obtained by reference to the following detailed description considered in connection with the accompanying drawings, in which:

FIG. 4B depicts a PAL plus video signal as an analog signal followed by a helper signal;

FIG. 7 is a block diagram of a PAL plus decoder according to a first embodiment of the present invention;

FIGS. 8A to 8D depict the luminance signal Y and the color difference signals $C_B, C_R$ on lines 23 to 623;

FIG. 10 is a block diagram of a PAL plus decoder according to the third embodiment of the present invention;

FIGS. 11A and 11B are block diagrams depicting a record side digital VCR according to the first embodiment;

FIG. 14C shows a track disposed on a recording medium with areas of the track allocated to different data structures;

FIGS. 21A, 21B and 21C are bit maps of data packs with different types of data stored in the data packs;

FIG. 22A is a bit map of a source pack of the VAUX data that stores the color phase information;

FIG. 22B is a bit map of a source pack of the VAUX data that stores the color phase information;

FIG. 36 is a PAL plus signal reproducing circuit according to the first embodiment;

DETAILED DESCRIPTION OF THE PREFERRED EMBODIMENTS

Figure 1A:
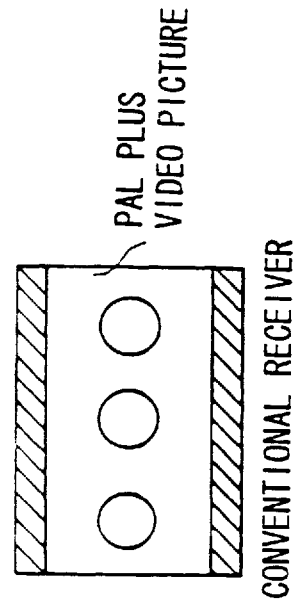
FIGS. 1A and 1B depict a PAL plus receiver and a PAL plus video picture superimposed on a conventional receiver, respectively.
Figure 1B:
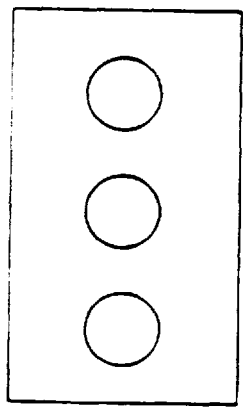
Figure 1C:
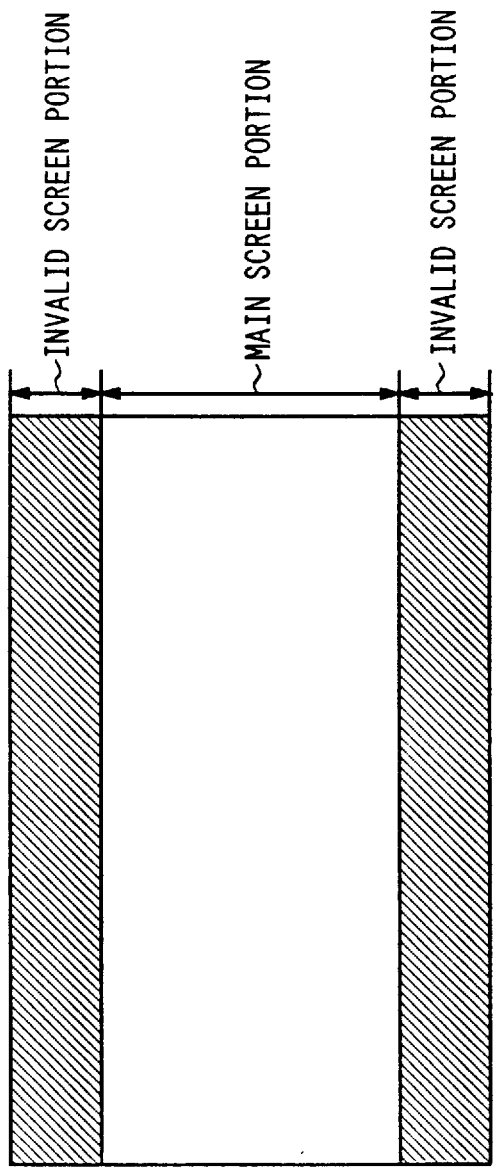
FIG. 1C shows a general lay out of a PAL plus video picture.

Referring now to the drawings wherein like reference numerals designate identical or corresponding parts throughout the several views, the recording side of the digital video signals recording/reproducing apparatus of the present invention will be discussed with reference to FIG. 6.

PAL Plus Recordation

A tuner 100 receives a transmitted PAL plus signal. The received PAL signal is processed by the PAL plus signal recording circuit 102 and the PAL plus signal is converted into a luminance signal Y, color difference signals $C_B, C_R$ and information about the PAL plus signals. The digital VCR 104 processes these signals and records them on the recording medium.

PAL Plus Signal Recording Circuit

Figure 6:
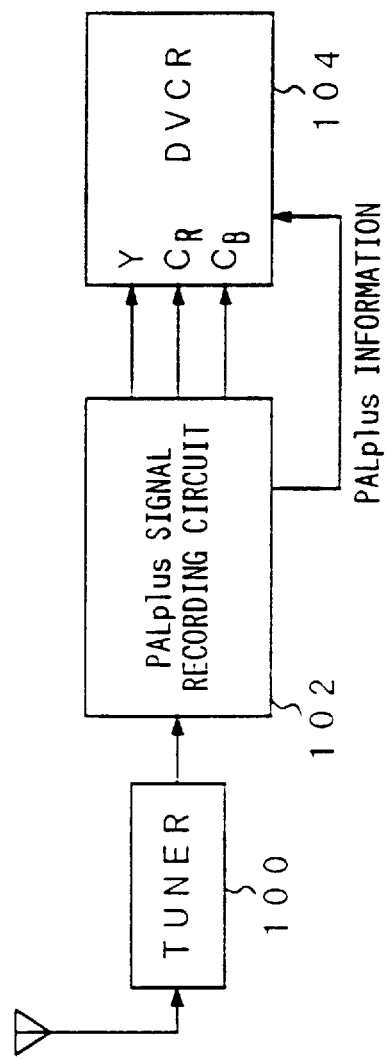
FIG. 6 is a block diagram of the recording side of the present invention.

The PAL plus signal recording circuit 102 of FIG. 6 may be constructed according to the first embodiment shown in FIG. 7. The received PAL plus signal is input to the PAL plus signal recording circuit 102 through terminal 106 and subsequently forwarded to the Y/C separating circuit 108, the helper signal demodulating circuit 110 and the WSS detecting circuit 112. The Y/C separating circuit 108 separates the PAL plus signal into a luminance signal Y and a chrominance signal C and forwards the signals to the PAL signal decoding circuit 114. The decoded luminance signal Y is, then, sent to a switch 126. The switch 126 outputs the luminance signal Y to the digital VCR 104 during lines 60 to 74 (FIG. 2A) of the PAL plus video picture and outputs a DC offset voltage, known as a "pedestal" voltage, during all other times of the PAL plus signal. The color difference signal $C_R$ is output directly to a line sequence filter 116, while the color difference signal $C_B$ is combined by the adder 118 with the helper signal and output to the line sequence filter 116.

The line sequence filter 116 sequences the color difference signals $C_B, C_R$ so that the helper signal is output to the digital VCR during lines 24 to 59, 275 to 310, 336 to 371 and 587 to 622 and the color difference signals $C_B, C_R$ are alternately sent to the digital VCR 104 during lines 372 to 586.

The helper signal demodulating circuit 110 demodulates the helper signal from the PAL plus signal and outputs the same to the helper killer circuit 124. The helper circuit 124 is enabled to kill, or suppress, the helper signal when the digital VCR 104 cannot properly record the helper signal, such as when the frequency band of the digital VCR 104 is significantly narrower than the helper signal. When the helper killer circuit 124 is disenabled, the helper signal is output to the adding circuit 118 and stored by the digital VCR.

The WSS detecting circuit 112 detects the WSS signal included on line 23 of the PAL plus signal. The output of the WSS detecting circuit is sent to both the line counter 122 and the WSS rewriting circuit 120. The line counter counts the lines corresponding to the PAL plus signal and causes both the switch 126 and the line sequence filter 116 to output the appropriate signals according to the scheme shown in FIG. 2A.

Conventional VCRs may be used to store the Y and $C_B, C_R$ signals. Since these VCRs include conventional PAL decoding circuitry, the conventional VCR would decode there signals again. To avoid this problem, the WSS rewriting circuit 120 rewrites the WSS signal so that the digital VCR 104 will recognize that the PAL plus signal does not need to be decoded.

As an example of the operation of the PAL plus signal recording circuit 102 of the first embodiment, the signal processing of the PAL plus signal will be described with reference to FIG. 4A, FIG. 7 and FIGS. 8A to 8D. The PAL plus video signal is input to terminal 106 of the PAL plus signal recording circuit 102 (FIG. 7) as the data stream shown in FIG. 4A. The signal processing begins when the vertical blanking interval ends and line 23 is input to the PAL plus signal recording circuit 102. At this time, the WSS detecting circuit 112 detects that a WSS signal is present on line 23 and outputs the detected signal to the WSS rewriting circuit 120. The WSS rewriting circuit 120 rewrites the WSS signal in a format which is suitable for the particular VCR employed and so that the digital VCR 104 will recognize that the PAL plus signal has been decoded. During this time, the luminance signal Y is maintained at a black level (digital value of 16), and the color signal $C_R$ is maintained at a DC offset (digital value 128) as shown in FIG. 8A.

After the WSS signal is processed, the helper signal on lines 24 to 59 of the PAL plus signal is transmitted to the PAL plus signal recording circuit 102. The helper signal demodulating circuit 110 demodulates the helper signal and outputs the demodulated signal to the helper killer circuit 124. For the purpose of this example, it will be assumed that the digital VCR 104 can properly record the helper signal and the helper killer circuit 124 is disabled. Accordingly, the helper signal is output to the adder 118 and combined with the color difference signal $C_B$ as shown in FIG. 8B. At this time, the luminance signal Y is maintained at the black level since the PAL plus signal is not transmitting a luminance signal Y.

The luminance signal Y is transmitted in the PAL plus signal corresponding to lines 60 to 274. At that time, the Y/C separating circuit 108 outputs the luminance signal Y to the PAL signal decoding circuit 114. The PAL signal decoding circuit 114 decodes the luminance signal Y and outputs the result to the switch 126. The line counter 122 switches the switch 126 to the terminal 126a during the transmission of lines 60 to 274 and the switch 126 outputs the luminance signal Y shown FIG. 8C to the digital VCR 104. Thus, the first field of FIG. 2A corresponding to the luminance signal Y is output to the digital VCR 104.

The PAL plus signal recording circuit 102 then receives the helper signal corresponding to lines 275 to 310, the vertical blanking interval on lines 311 to 335 and another helper signal on lines 336 to 371. As before, the helper signal on lines 275 to 310 and lines 336 to 371 are demodulated by the helper signal demodulating circuit 110, output through the helper killer circuit 124 and superimposed on the color difference signal $C_B$. With the vertical blanking interval of lines 311 to 335, the PAL plus signal recording circuit 102 outputs the signals shown in FIG. 8A, corresponding to the black level for the luminance Y and the color difference signal $C_R$.

The PAL plus signal corresponding to the color difference signals $C_B,C_R$ on lines 372 to 586 are output by the PAL signal decoding circuit 114. The color difference signal $C_R$ is directly output to the line sequence filter 116, whereas the color difference signal $C_B$ is output to the adder 118. Since, the helper signal is not present, the color difference signal $C_B$ passes through the adder 118 unaffected and is output to the line sequence filter 116. The line sequence filter 116 combines the color difference signals $C_B,C_R$ by alternating the output between the $C_B,C_R$ signals as shown in FIG. 8C.

As before, the helper signal on lines 587 to 622 is superimposed on the color difference signal $C_B$ by adder 118. The wave forms of the luminance signal Y and the color difference signals $C_B,C_R$ are set to fixed levels as before (FIG. 8B).

The PAL plus signal corresponding to line 623 which includes the white 100% reference level shown in FIG. 8D, is input to the terminal 106 of the PAL plus signal recording circuit 102. The white 100% level is superimposed on the luminance signal Y and stored by the digital VCR 104. After line 623, the PAL plus signal begins another vertical blanking interval on line 624 and the PAL plus signal recording circuit operation is complete.

While the above example superimposes the helper signal on the $C_B$ signal line, the helper signal may also be superimposed on the $C_R$ signal line.

Figure 9A:
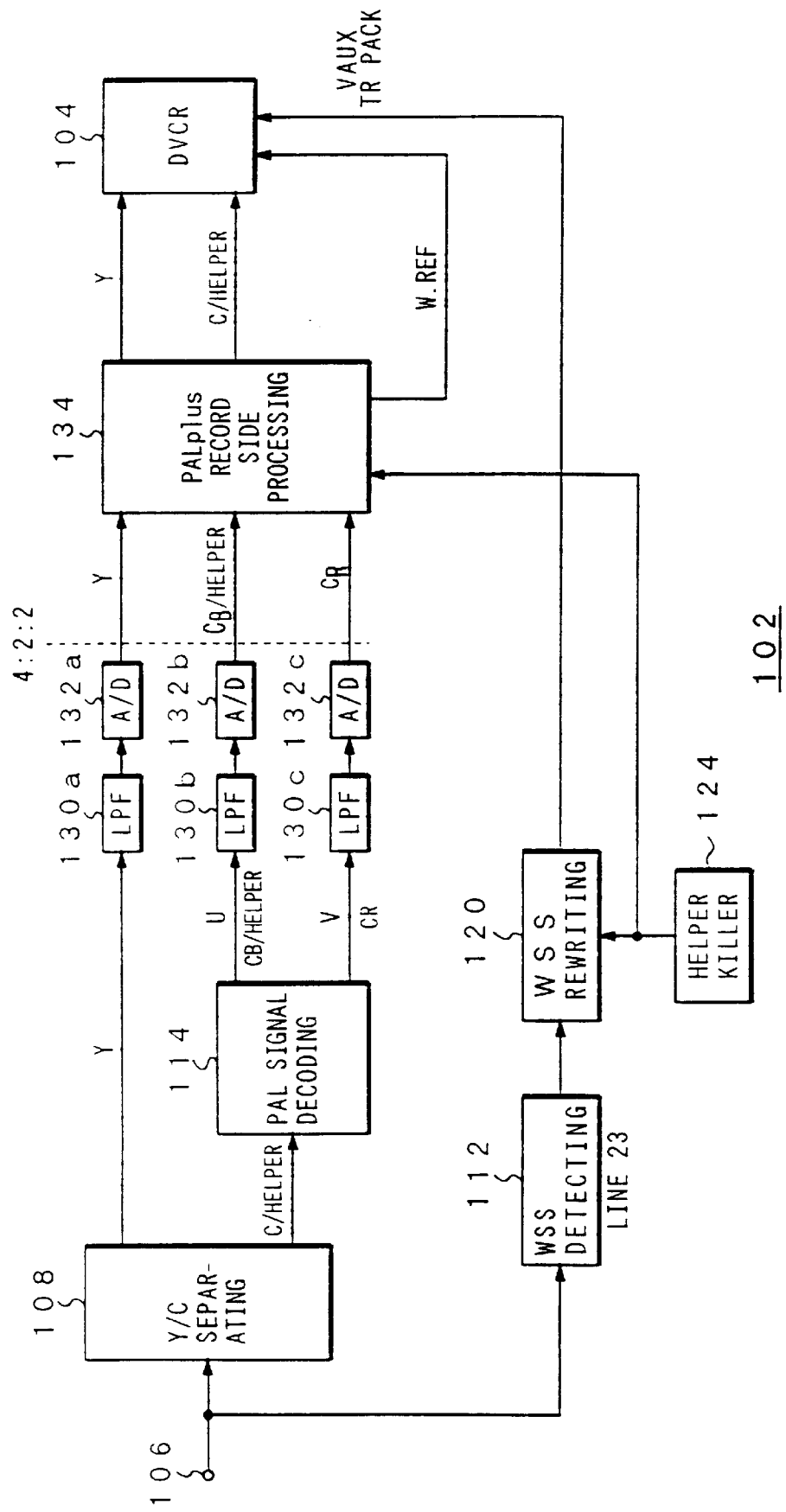
FIG. 9A is a block diagram of a PAL plus decoder according to the second embodiment of the present invention.
Figure 9B:
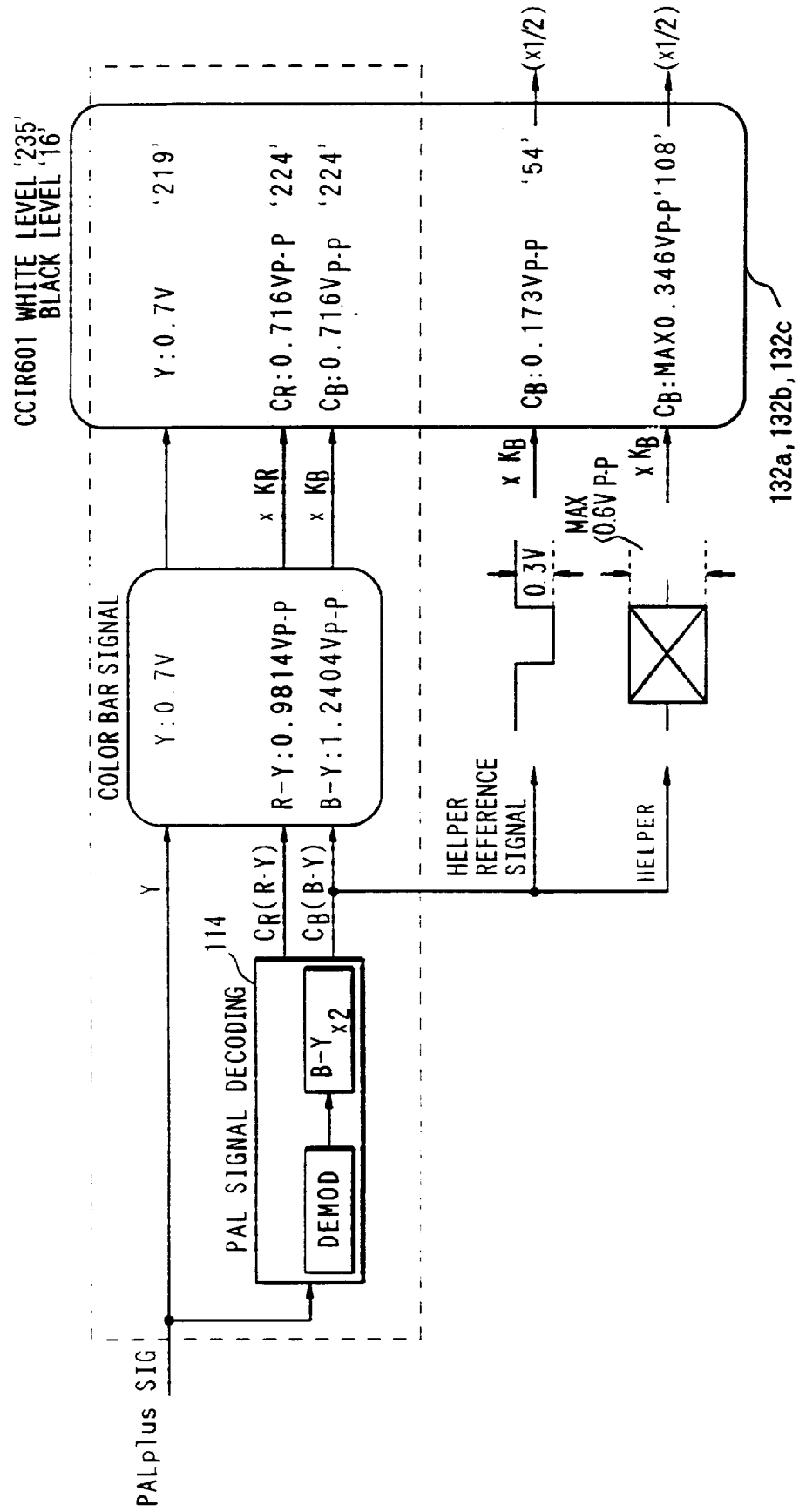
FIG. 9B depicts the normalization of the luminance signal Y and the color difference signals $C_B, C_R$.
Figure 9C:
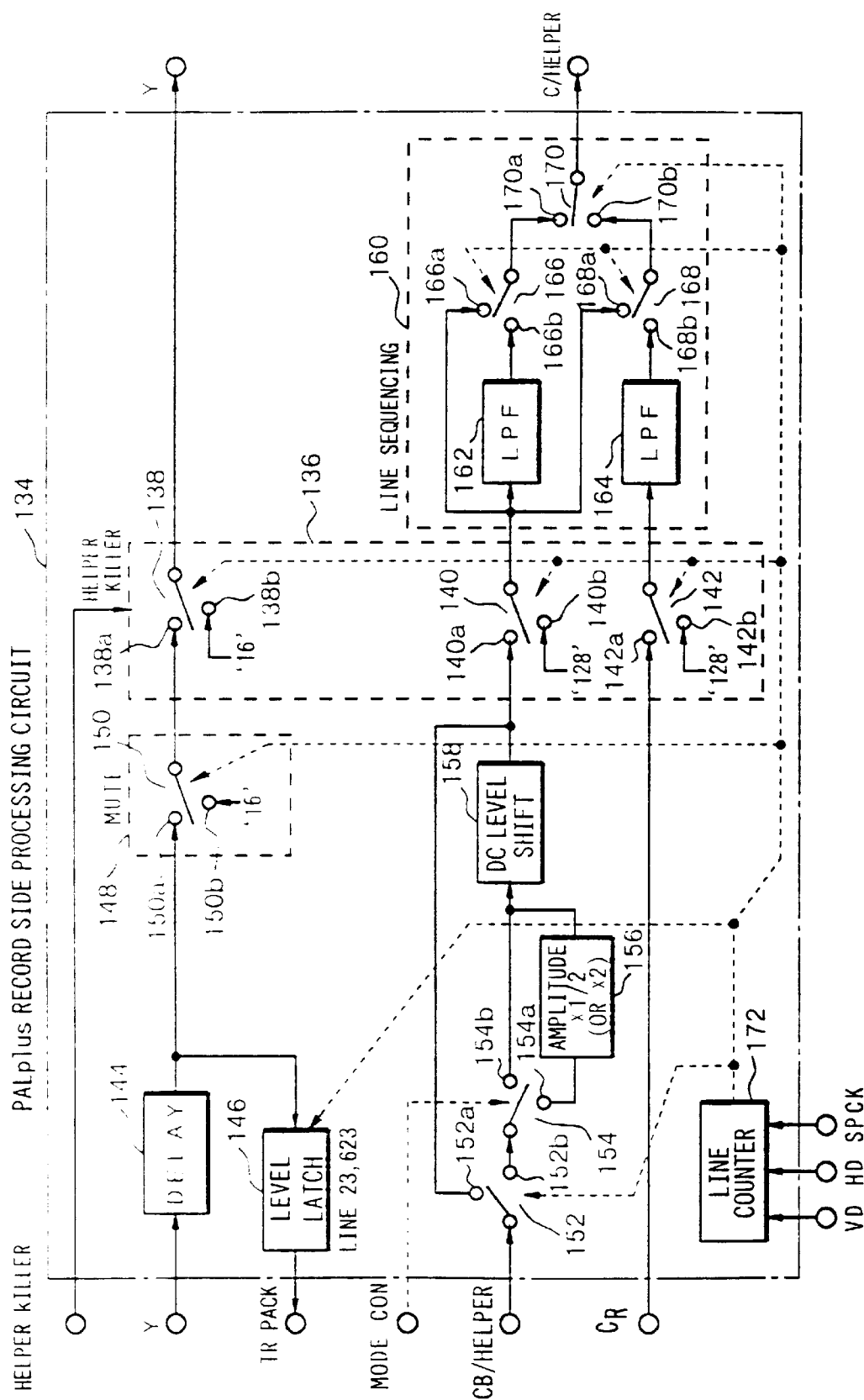
FIG. 9C is a block diagram of a PAL plus record side processing circuit according to the second embodiment of the present invention.

The second embodiment of the PAL plus signal recording circuit 102 in FIG. 6 is shown in FIGS. 9A to 9C. Similar to the previous embodiment, the helper signal is superimposed on the color difference signal $C_B$. As shown in FIG. 9A, a PAL plus signal is input to terminal 106 and sent to a Y/C separating circuit 108 and a WSS detecting circuit 112. As before, the Y/C separating circuit 108 separates the PAL plus signal into a luminance signal Y and a color signal C. Similarly, the WSS detecting circuit 112 operates in the same manner as described with reference to the first embodiment and detects a WSS signal, indicating the presence of the helper signal. The WSS signal is rewritten by a WSS rewriting circuit 120 and sent to the digital VCR 104 to indicate that the PAL plus signal does not need to be decoded again.

The second embodiment employs an integrated circuit IC 134 to perform the PAL plus record side processing and differs in this respect from the first embodiment. Since an IC circuit inputs digital signals, the separated luminance signal Y and the color signal C must be digitized for input to the PAL plus record side processing circuit 134. Thus, the luminance signal Y is sent to a low pass filter 130a and then converted into a digital signal by the analog-to-digital converter 132a before being sent to the PAL plus record side processing circuit 134. The color signal C is sent to a PAL signal decoding circuit 114 where the color signal C is converted into color difference signals $C_B,C_R$. The color difference signals are then sent to low pass filters 130b, 130c, respectively, and converted into digital signals by analog-to-digital converters 132b and 132c, respectively, before being sent to the PAL plus record side processing circuit 134.

The helper signal is superimposed on the color difference signal $C_B$ and consequently digitized by the low pass filter 130b and the analog-to-digital converter 132b. The helper killer circuit 124 outputs the helper killer signal directly to the PAL plus record side processing circuit 134. The helper killer signal is also sent to the WSS rewriting circuit 120 in the second embodiment to kill the WSS signal for the same reasons that the helper signal is killed, or suppressed, in the digital VCR 104 (i.e., the digital VCR 104 cannot properly record the helper signal, such as when the digital VCR has a narrow record band) That is the WSS signal is part of the helper signal and also contains many high band components. For this reason, the WSS signal is also killed when the helper signal is killed by the helper killer circuit 124.

The signals output from the analog-to-digital converters 132a, 132b and 132c (as described in the above pre-processing operation) are in the 4:2:2 format. The PAL plus record side processing circuit 134 normalizes the 4:2:2 format into a 4:2:0 format as shown by the dashed line in FIG. 9A. The normalization process is performed by the PAL signal decoding circuit 114, the low pass filters 130a, 130b and 130c, the analog-to-digital converters 132a, 132b and 132c. As shown in FIG. 9B, the luminance signal Y is multiplied by a factor of 0.7 volt (digital value 219). The chrominance signal C is sent to the PAL signal decoding circuit 114 and decoded into the color difference signals $C_B, C_R$. The color difference signal $C_B$ is demodulated and multiplied by a factor of 2. The color difference signals $C_B, C_R$ are then multiplied by factors $C_B, C_R$, respectively, so that the color difference signals $C_B, C_R$ are in a 1:1 ratio (0.716 volt$_{P-P}$; digital value 224). The helper reference signal is "picked" off the color difference signal $C_B$ line and multiplied by a factor of $K_B$ (0.173 $V_{P-P}$; digital value 54). The helper signal is also "picked" off the color difference signal $C_B$ line and multiplied by a factor of $K_B$ (MAX 0.346 $V_{P-P}$; digital value 108). The helper reference signal and the helper signal are multiplied by a factor of ½ and output to the PAL plus record side processing circuit 134. The resulting signals Y, $C_B$, $C_R$ are then sent to the PAL plus record side processing circuit 134.

The PAL plus record side processing circuit 134 shown in FIG. 9C processes the luminance signal Y and the color difference signals $C_B, C_R$. The color difference signal $C_B$ is directed through terminal 152a, by passing the amplitude designating circuit 156 and DC level shift circuit 158, to the helper killer circuit 138. The color difference signals $C_B, C_R$ are passed through the helper killer circuit and alternately combined into a single chrominance signal C to create a 4:2:0 (Y:C:O) format. The luminance signal Y is supplied to a delay circuit 144 which corrects the deviations generated in the PAL plus record side processing circuit 134 between the timings of the luminance signal Y and the color difference signals $C_B$ and $C_R$ The delayed luminance signal Y is output through the switch 138 of the helper killer circuit 136 to the output terminal Y. The delayed luminance signal Y is output to a level latch circuit 146 which is controlled by a line counter 172 to latch the PAL plus signal corresponding to lines 23 and 623, (i.e., the helper signal and reference signals).

Figure 4A:
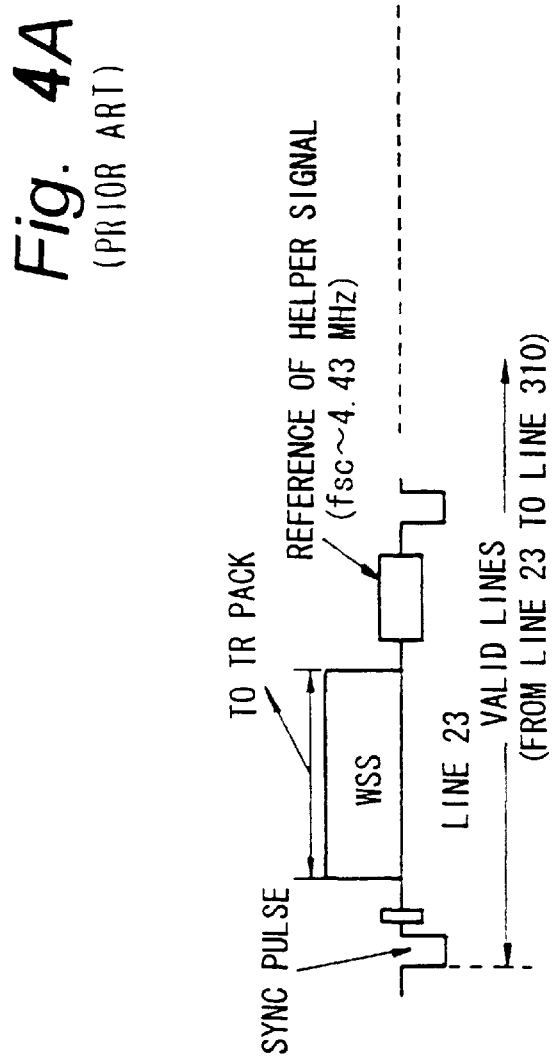
FIG. 4A depicts the PAL plus video picture as a data stream of signals starting on line 23 and ending at line 623.
Figure 4C:
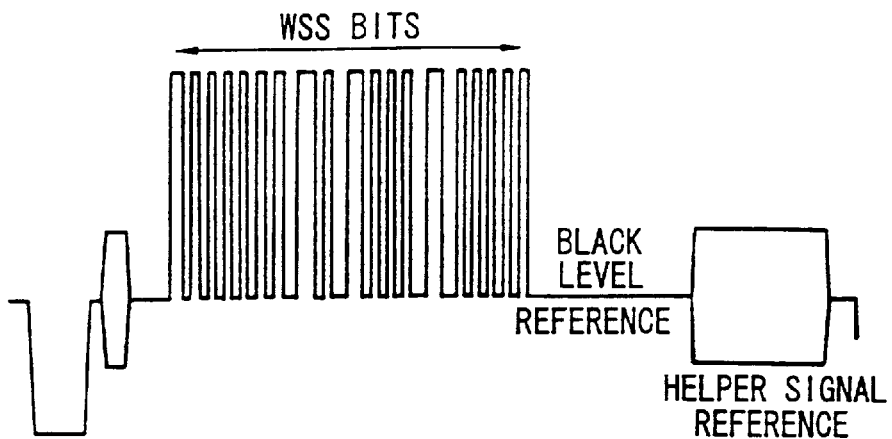
FIG. 4C depicts line 23 of the PAL plus video signal as a digital signal.
Figure 4D:
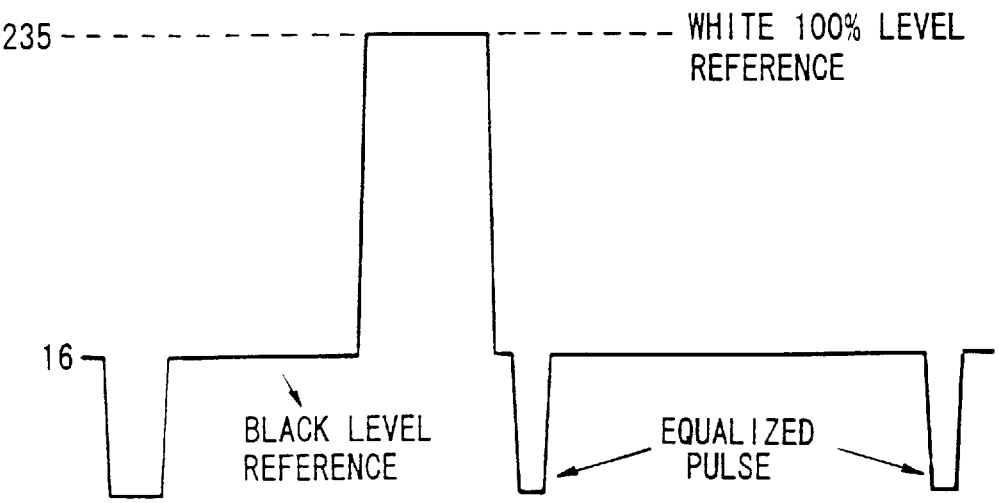
FIG. 4D depicts line 623 of the PAL plus video signal as a digital signal.
Figure 5A:
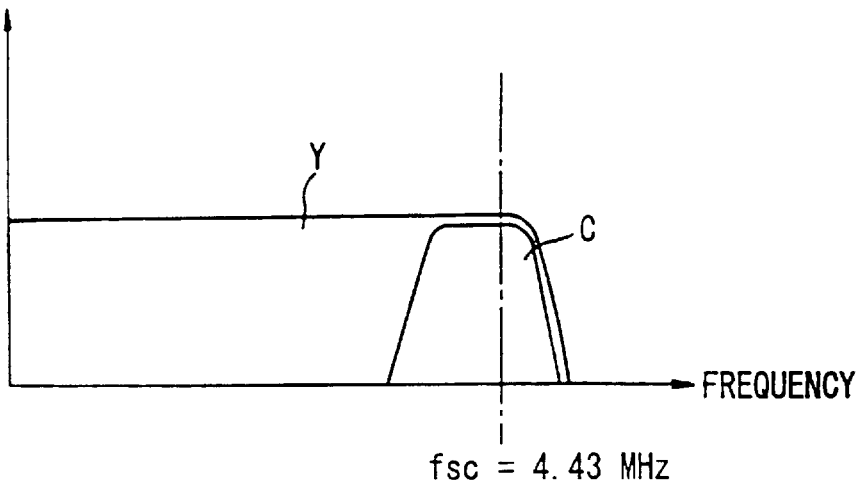
FIGS. 5A and 5B show frequency-domain diagrams of the luminance signal Y and the chrominance signal C with the helper signal, respectively.
Figure 5B:
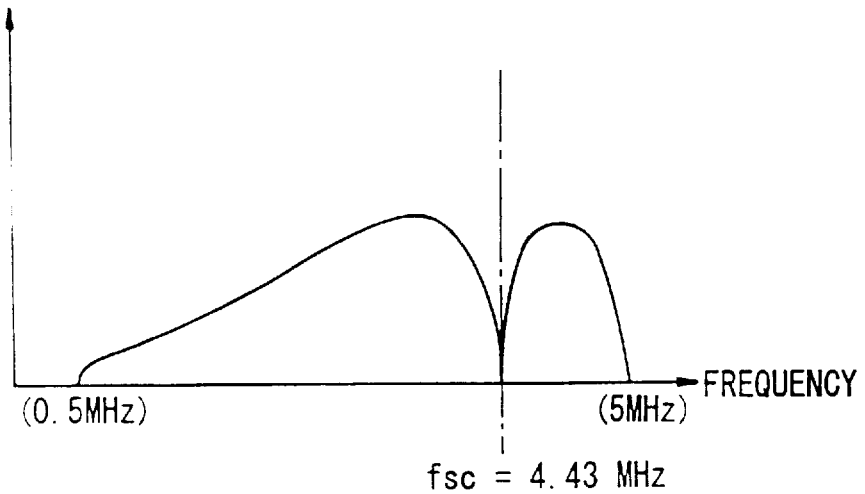

The WSS signal recorded on line 23 of the PAL plus has a step-shaped waveform as shown in FIG. 4C, which degrades the compression efficiency of the DCT compression process performed in the digital compression of the digital VCR 104. To prevent the degradation of the DCT compression process, the present invention employs a mute circuit 148 which mutes the WSS signal by switching the luminance signal to the terminal 150b, corresponding to the pedestal level (digital value 16). Thus, the mute circuit 148 outputs either a luminance signal Y for all valid lines or the pedestal level 16 during the WSS signal to a switch 138 of the helper killer circuit 136 and the DCT compression process is not degraded.

The amplitude of the white 100% reference signal on line 623 is not only employed to reconstruct the PAL plus signal corresponding to the video picture, but is also employed to reconstruct the helper signal. However, line 623 is within the vertical blanking period (FIG. 4A), and would normally be eradicated during the vertical blanking interval. For this reason, the level latch 146 also latches the white 100% reference signal and outputs the same to the digital VCR 104.

While the white 100% reference signal is successfully latched by the level latch 146 in the ideal situation where the electric field intensity of the transmitted PAL plus signal is satisfactorily strong, sometimes the white 100% reference signal cannot be restored because the electric field intensity of the transmitted PAL plus signal is weak. In this situation, a data value of FFh (hexadecimal) may be supplied to the TR pack terminal during transmission of the white 100% reference signal on line 623. While the substituted data FFh is not a perfect substitution for the white 100% reference signal, the data FFh has been found to work satisfactorily well and a video picture can be reconstructed from the received PAL plus video signal with good image quality.

The WSS signal and the white 100% reference signal are output through a TR pack terminal to the digital VCR. The digital VCR 104 stores data received from the TR pack terminal in a special data pack called a TR pack, which will be discussed below in more detail with reference to the digital VCR 104.

The helper killer circuit suppresses the helper signal by switching the signals Y, $C_B, C_R$ off when the helper signal is transmitted. During the main screen portions of the PAL plus video picture, (i.e., lines 60 to 274 and lines 372 to 586), the switches 138, 140 and 142 of the helper killer circuit 136 are all switched to the terminals 138a, 140a and 142a so that the luminance signal Y and the color difference signals $C_B, C_R$ are output from the helper killer circuit 136. The luminance signal Y is output the digital VCR directly from the helper killer circuit 136. The color difference signals $C_B, C_R$ are output from the helper killer circuit 136 to a line sequencing circuit 160, where the signals are alternated onto a single color signal line C/HELPER. At this time, the switches 166 and 168 are set to the terminals 166b and 168b, respectively, and the corresponding color difference signal output from the low pass filters 162, 164 are alternated by switch 170 to the C/HELPER signal line. Since the color difference signals $C_B, C_R$ are alternated on a single C/HELPER signal line, the format of the PAL plus signal output from the PAL plus record side processing circuit 134 is 4:2:0.

When the helper signal on the $C_B$/HELPER signal line is input to the PAL plus record side processing circuit 134, switch 152 is switched to terminal 152b and the signal is not output directly to the helper killer circuit 136. Instead, the helper signal is output to a switch 154 controlled by an external mode control signal), an amplitude designating circuit 156 and a DC level shift circuit 158. When switch 154 is set to the terminal 154a, the DC level shift circuit 158 digitally shifts the helper signal according to the amplitude designated by the amplitude designating circuit. On the other hand, when the switch 154 is set to terminal 154b, no amplitude is designated and the DC level shift circuit 158 does not digitally shift the helper signal. By digitally shifting the helper signal, an operator can vary the effect of the vertical resolution compensation.

When the helper killer circuit 138 is enabled, the switches 138, 140 and 142 are set to the terminals 138b, 140b and 142b, respectively, and the helper killer circuit 136 outputs fixed digital values during the transmission of the helper signal. During the main portions of the PAL plus video picture, the helper killer circuit 136, of course, sets the switches to 138a, 140a and 142a to output the luminance signals Y and the color difference signals $C_B, C_R$. When the helper killer circuit 136 is disabled, the switches 138, 140 and 142 are set to terminals 138a, 140a and 142a for all lines of the PAL plus signal and the helper signal is output to the line sequencing circuit 160. When the helper signal is output to the line sequencing circuit 160, switches 166 and 168 are set to terminals 166a and 168a, respectively and the helper signal by passes the low pass filter 162. Moreover, the helper signal is not alternated by switch 170 because both of the terminals 170a and 170b are connected to the helper signal line.

An example of the operation of the above-described PAL plus record side processing circuit 134 will be described with reference to the line counter 172, which controls the flow of signals according to different lines of the PAL plus video picture.

The WSS signal and reference helper signal corresponding to line 23 are input, and the line counter 172 causes the level latch circuit 146 to latch the WSS signal from the delay circuit 144. At this time, the mute circuit 148 outputs the pedestal level "16" as the luminance signal Y.

The helper signal corresponding to lines 24 to 59 is then transmitted to the PAL plus record side processing circuit 134. At this time, the line counter 172 causes the switch 152 to output the helper signal to terminal 152b. When an operator sets switch 154 to 154b, the amplitude designating circuit 156 designates an amplitude and the helper signal is digitally shifted by DC level shift circuit 158 according to the designated amplitude. In this example, the helper killer circuit 136 is disabled and the helper signal is transmitted from the DC level shift circuit 158, through the switch 140, to the line sequencing circuit 160. Switches 166 and 168 are switched by the line counter 172 to terminals 166a and 168a, respectively. Thus, the helper signal is diverted around the low pass filter 162 and output directly to the switch 170. Since both terminals 170a and 170b are connected, via terminals 166a and 168a, to the helper signal, the helper signal is output without alternation to the C/HELPER signal line.

When the main screen portion corresponding to lines 60 to 274 of the PAL plus video picture is transmitted to the PAL plus record side processing circuit 134, the line counter 172 switches switch 152 to terminal 152a in order to output the color difference signal $C_B$ to the helper killer circuit 136, thus circumventing the amplitude designating circuit 156 and the DC level shift circuit 158. The helper killer circuit 136 will always transmit the color difference signals $C_B,C_R$ when the main screen portion of the PAL plus video picture is being transmitted. Thus, the color difference signal $C_B$ is transmitted directly to the line sequencing circuit 160. Similarly, the color difference signal $C_R$ is transmitted through the switch 142 of the helper killer circuit 136 directly to the line sequencing circuit 160. During this time, the line counter 172 sets switches 166 and 168 to terminals 166b and 168b, thus outputting the color difference signal $C_B$ to terminal 170a and color difference signal $C_R$ to terminal 170b. The line counter 172 causes the switch 170 to alternately switch between terminals 170a and 170b and output the color difference signals $C_B,C_R$ alternately to the C/HELPER signal line.

Figure 2A:
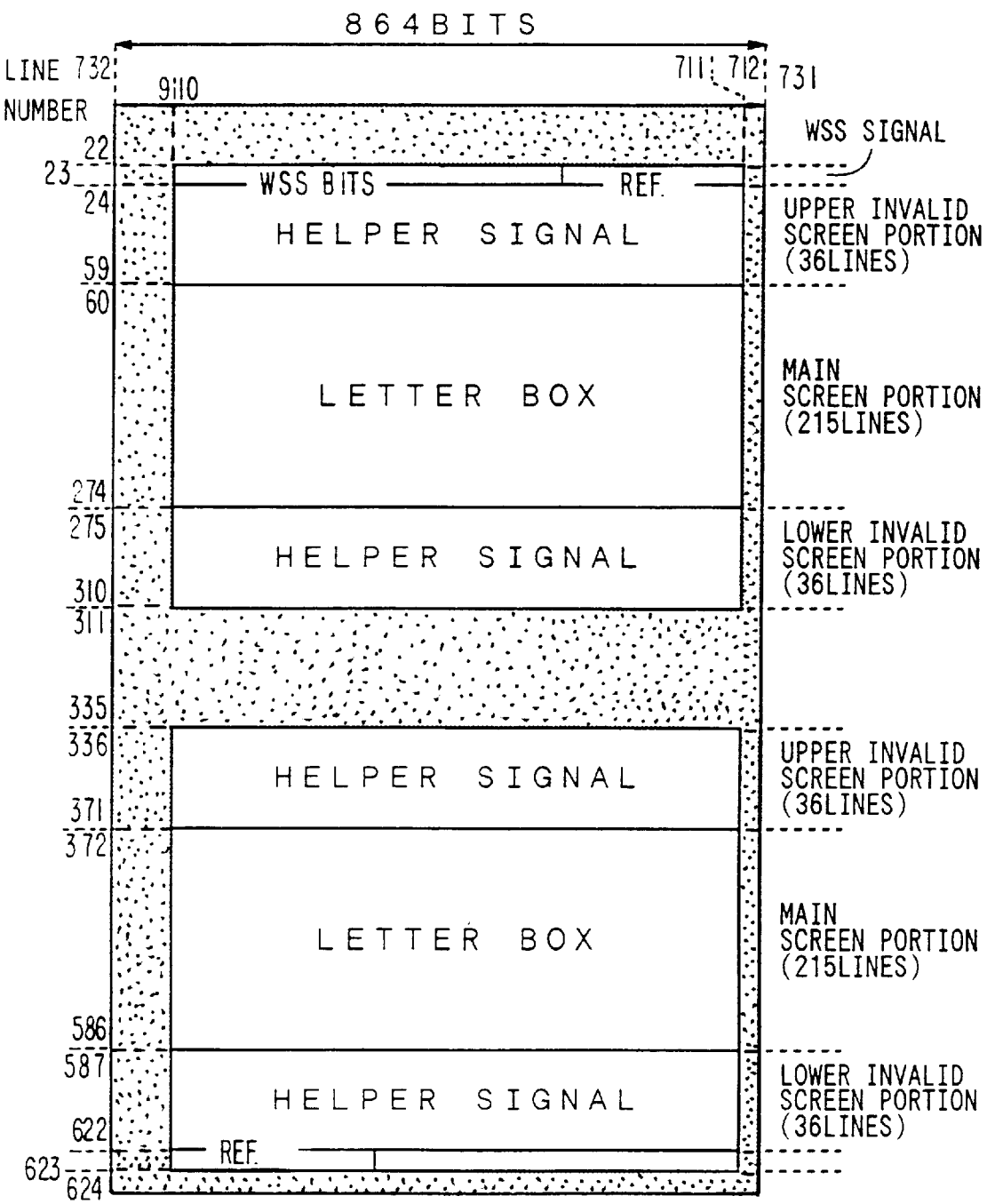
FIGS. 2A and 2B show in detail the PAL plus video picture and the EDTV-2 video picture.
Figure 2B:
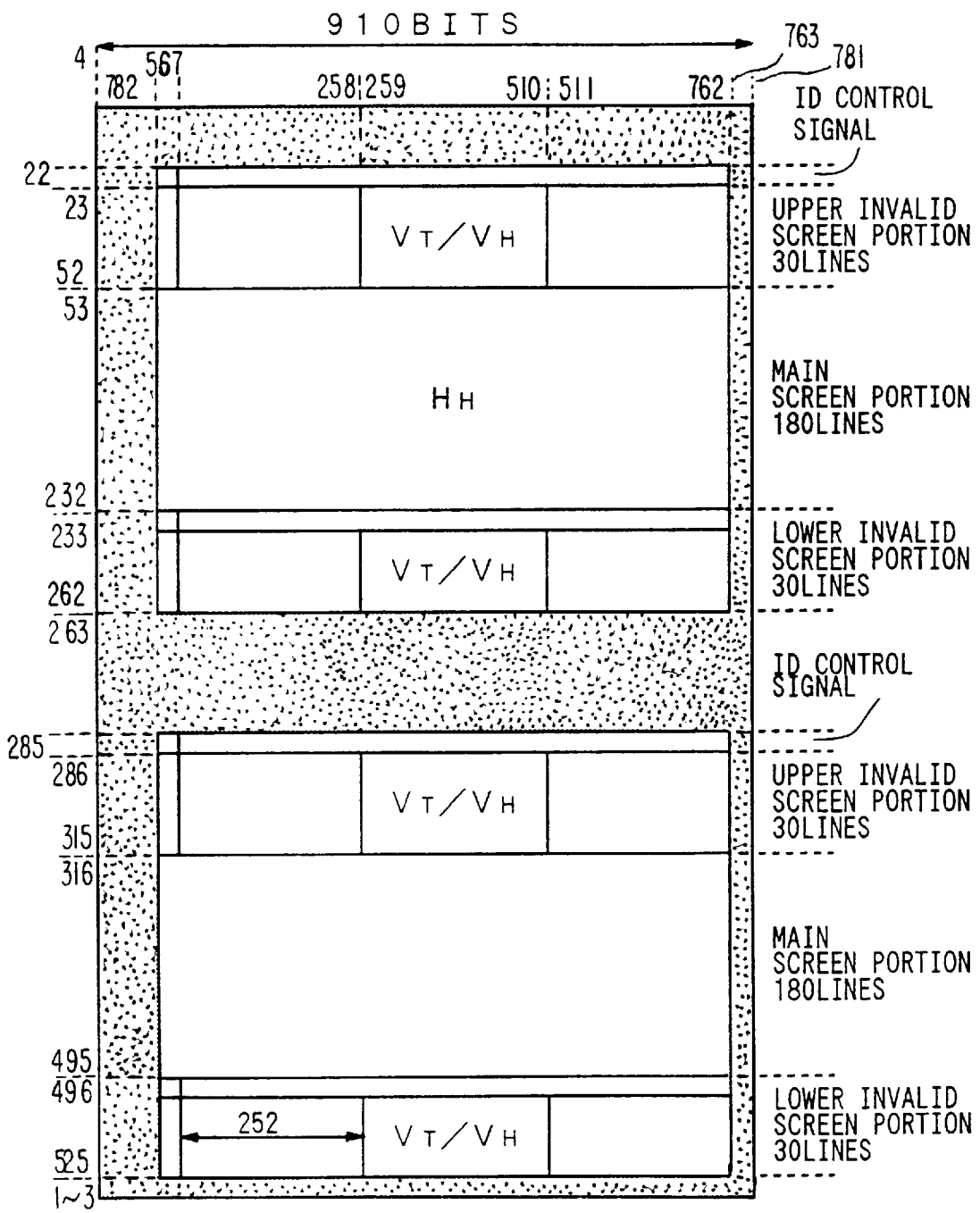
Figure 3:
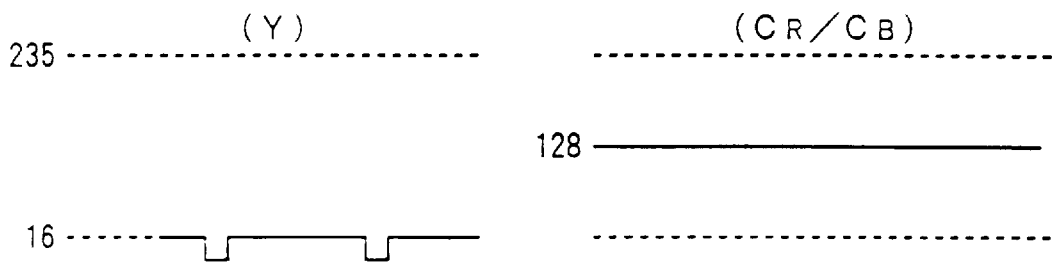
FIG. 3 shows that lines 60 to 274 of the PAL plus video picture correspond to a luminance signal Y and lines 372 to 586 correspond to the color difference signals $C_B, C_R$.

The remainder of the PAL plus video picture comprises helper signals on lines 275 to 310, 336 to 371 and 587 to 622, and a second main screen portion on lines 372 to 586. These signals are processed by the PAL plus record side processing circuit 134 in the same manner as described with reference to the helper signal on lines 24 to 59 and the main screen portion on lines 60 to 274; and an analysis of the operation of the PAL plus record side processing circuit 134 will not be repeated. In regard to line 623, the white 100% reference signal is latched by level latch circuit 146, similar to the WSS signal, and output to the TR pack, which will be described later with reference to the digital VCR 104. Thus, the PAL plus video picture shown in FIG. 2A is processed by the PAL plus record side processing circuit 134 of FIG. 9C.

FIG. 10 depicts the PAL plus signal recording circuit 102 of the present invention according to a third embodiment. The third embodiment is similar in structure to the first embodiment shown in FIG. 7 except that the white 100% reference level on line 623 is digitally converted and latched by the analog-to-digital converter 174 and latch 176; and the operation of the PAL plus signal recording circuit 102 is controlled by the synchronous signal separating circuit 180 and the line decoder 182.

The other circuit elements of the PAL plus signal recording circuit 102 remain generally the same as in the first embodiment. The Y/C separating circuit 108, for example, separates the luminance signal Y and the color signal C from the PAL plus signal. The luminance signal Y is output to output terminal Y and the color signal C is demodulated by a chroma demodulating circuit 184 into color difference signals $C_B,C_R$. A helper signal demodulating circuit 110 demodulates the helper signal and an adder 118 adds the helper signal to the color signal C line. Finally, a WSS detector 112 and WSS rewriting circuit 120 detect and rewrite the WSS signal.

The analog-to-digital converter 174 and latch 176 retrieve the white look reference signal from the luminance signal Y because the white 100% reference signal would otherwise be lost. As shown in FIG. 4A, the white 100% reference signal is located on line 623 and occurs during a vertical blanking interval. Since digital VCRs do not record information during the vertical blanking interval, the white 100% reference level would be lost unless retrieved by other means. The present invention resolves this problem by converting the luminance signal Y into digital form, via analog-to-digital converter 174, and latching the white 100% reference level, via latch 176, when the line decoder 182 determines that line 623 is being transmitted. The digitized white 100% reference level is then superimposed on the TR pack data line with the WSS signal and recorded by the digital VCR 104 as a TR pack. As discussed, the TR pack is stored by the digital VCR 104 on the recording medium and later retrieved to reconstruct the recorded PAL plus signal.

The synchronous signal separating circuit 180 detects the horizontal and vertical synchronous signals, which are included in the PAL plus signal to indicate where the horizontal lines begin and the vertical blanking interval occurs. The line decoder 182 employs the horizontal and vertical synchronous signals to determine which line of the PAL plus signal is being currently transmitted and controls the circuit elements of the PAL plus signal recording circuit 102 accordingly. When, for example, line 23 is being transmitted, the line decoder 182 causes the WSS detecting circuit 112 to detect the WSS signal. When lines 24 to 59, 275 to 310, 336 to 371 and 587 to 622 are being transmitted, the line decoder causes the helper signal demodulating circuit 110 to demodulate the helper signal and superimpose the helper signal onto the color signal C line, via adder 118. The line decoder 182 also controls the latch 176, as discussed above, to latch the white 100% reference level when line 623 is being transmitted. As discussed with reference to the first embodiment, the information of the pal PLUS signal, including the WSS signal and the white 100% reference level, are recorded to TR pack data; the luminance signal Y is output along with the color difference signals $C_B,C_R$; and the helper signal is superimposed on the color signal C line. The line decoder 182 also outputs switching information to a switching information output terminal, which is employed by the digital VCR 104 to mask the luminance Y and the color difference signals $C_B,C_R$.

Digital VCR

The decoded luminance signal Y and color difference signals $C_B,C_R$ are, then, sent to the digital VCR 104. A digital VCR 104 corresponding to the first embodiment will now be discussed with reference to FIGS. 11A and 11B. As shown, the luminance signal Y and the color difference signals $C_B,C_R$ are filtered by low-pass filters 200a, 200b and 200c, respectively. The filtered signals are then digitized by analog-to-digital converting circuits 202a, 202b and 202c, respectively, and output to a blocking circuit 204. The blocking circuit 204 segment the PAL plus video picture into blocks of 8 samples×8 lines, for example, which are more easily manipulated by the shuffling circuit 206. The shuffling circuit shuffles the blocks in order to prevent data recorded on the tap from being lost due to a mechanical defect, such as a head clogging or a horizontal tape scratch. The shuffling circuit 206 also changes the order of the luminance signal Y and the color difference signals $C_B,C_R$ in an order which is conducive to processing the signals in the digital VCR 104 at later stages.

Figure 27A:
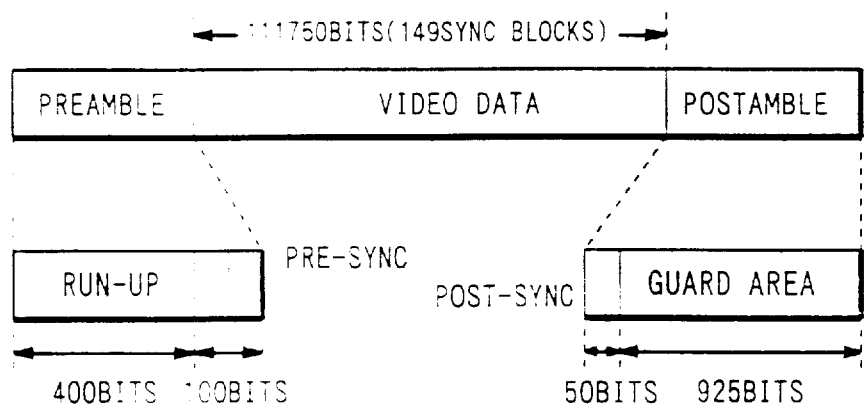
FIGS. 27A and 27B are bit maps of a sync block allocated to video data.
Figure 27B:
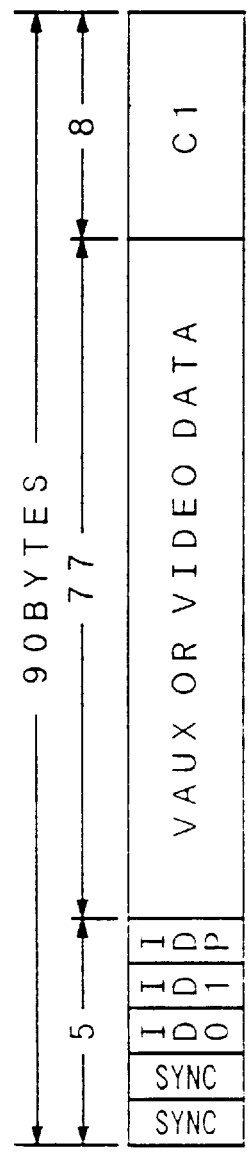

Once the blocks of the PAL plus video picture are shuffled by the shuffling circuit 206, the blocks are digitally compressed by the data compression and coding circuit 208. In the preferred embodiment, the data compression and coding portion 208 employs a DCT data compression process by compressing the data and quantizing the compressed data according to an estimated quantization factor generated by an estimator. The quantized coefficients are, then, sent to a framing circuit 210 where they are framed for recording on the recording medium. In general, the framing technique employed determines the arrangement of the bits corresponding to the compressed data on the recording medium. For example, and as will be discussed below, one such framing scheme is shown in FIGS. 27A and 27B, wherein the video data is framed as a video sync block. The adder 212 inserts the video auxiliary data VAUX output from the VAUX circuit 214 into the video sync block.

The audio data, similarly, is input through an analog-audio input and digitally converted by an analog-to-digital converting circuit 222. The audio data is shuffled by a shuffling circuit 224 and framed by a framing circuit 226, similar to the process of the video data. The audio data is combined by adder 228 with audio auxiliary data (AAUX) and output as ADATA.

The VAUX and AAUX data are generated by the signal processing microcomputer 220 and supplied to adders 212 and 228 through the VAUX circuit 214 and the AAUX circuit 218, respectively. The signal processing microcomputer 220 also generates subcode data which assists the digital VCR 104 in searching for video picture data on the recording medium. For example, the digital VCR 104 can fast-forward to a point on the recording medium by finding the subcode data that corresponds to the desired location on the recording medium. The subcode circuit 216 processes the subcode data and outputs a subcode identification signal (SID) and subcode data (SDATA).

Figure 11B:
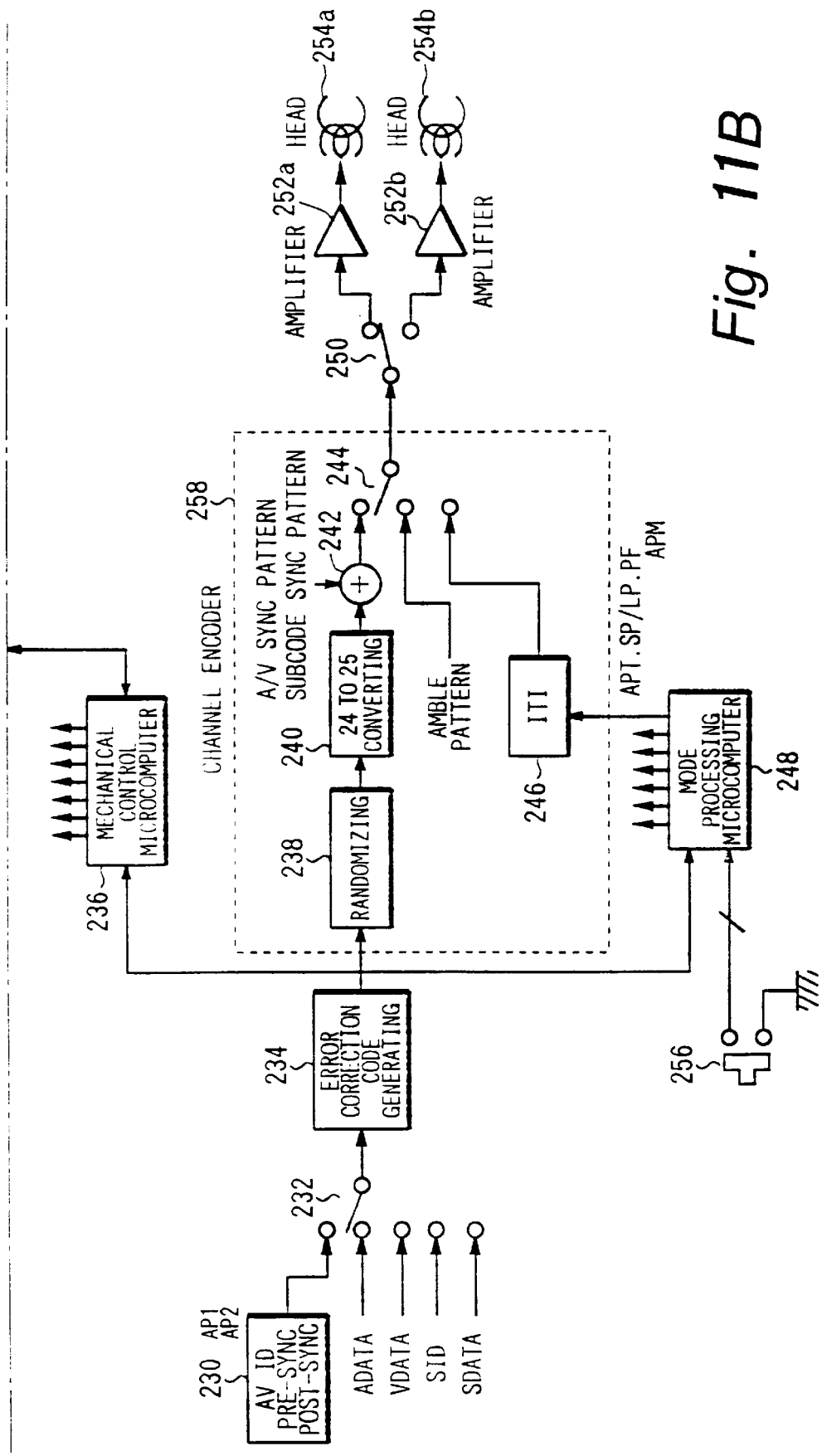

The ADATA, VDATA, SID and SDATA are supplied to a switch 232 as shown in FIG. 11B. A sync generating circuit 230 also outputs an audio/video identification signal (AV ID), a pre-sync signal, and a post-sync signal to the switch 232. As will be discussed, the switch 232 selects which type of data is to be recorded at a predetermined point on the recording medium by switching between the different data sources.

Figure 23:
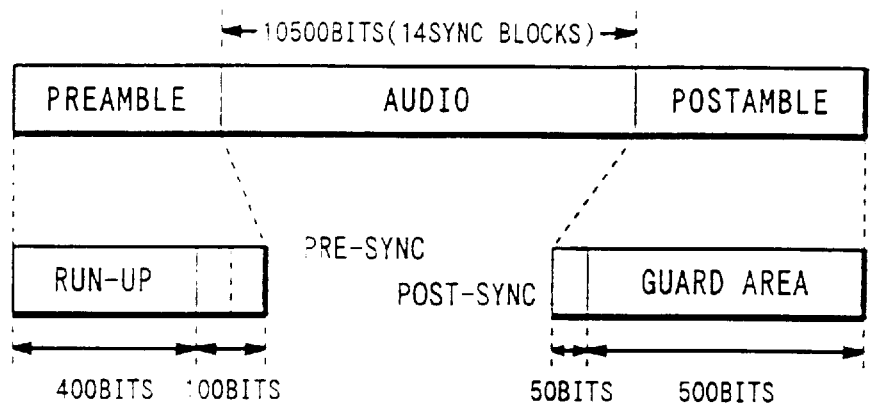
FIG. 23 is a bit map of a track area allocated as an audio sector.

When the audio data is to be recorded, for example, the switch 232 will select the sync generating circuit 230 to obtain a pre-sync signal. Then, the switch 232 switches to the ADATA output to obtain the audio data. The switch, then, switches back to the sync generating circuit 230 to obtain a post-sync signal, thus assembling the audio sync block shown in FIG. 23.

The output of the switch 232 is sent to an error correction code generating circuit 234. The error correction code generating circuit 234 adds a predetermined parity C1 to the signal received from the switch circuit 232 as shown in FIG. 24C. The parity is employed to determine and correct errors upon retrieval of the video signal from the recording medium.

The error corrected video signal is then randomized by a randomizing circuit 238, which randomizes the video signal in such a manner that the record data does not deviate. Randomizing the video signal in this manner assists in ensuring that the recorded signal is successfully retrieved from the recording medium.

The output of the randomizing circuit 238 is sent to a 24 to 25 converting circuit 240 which converts the randomized video signal from 24-bit data into 25-bit data. A DC component of the video signal in the recording medium can effect a sense current in a magnetic reproducing head and reduce the sensitivity thereof. This converting process has the effect of removing a DC component from the video signal that would otherwise adversely affect magnetic recording/reproducing operations.

At this point, an encoding process $(1/1-D_2)$, (not shown), known as a partial response class 4 (PR IV) suitable for a digital recording operation is performed. The result of the encoding process is sent to an adder 242 which adds an audio video sync pattern or a subcode sync pattern to the video signal.

The video signal thus processed is now ready to be recorded on a recording medium. The video signal is output through a switch 244 to an alternating switch 250, which alternates in synchronisity with a timing of the heads 254a and 254b. The video signal is then output from the alternating switch 250 to the amplifiers 252a or 252b and recorded onto the recording medium by the recording heads 254a or 254b.

An amble pattern and Insert and Track Information data (ITI) may also be selected by switch 244 and recorded on the recording medium. The ITI signal indicates the precise alignment of the sync blocks to follow and is inserted onto the recording medium at the beginning of a group of sync blocks as shown in FIG. 14C.

The mode processing microcomputer 248 determines the mode of the entire digital VCR 104 by processing control signals of the digital VCR. An SP/LP signal (short or long play), a pilot frame bit for representing a reference frame of the servo system, and an Application ID of a Track for indicating whether the track is an audio or video area are some control signals input from a switch block 256 which are used to determine the mode. On the other hand, a recording or reproducing mode is automatically initiated when a tape is being played or recorded. The mode processing microcomputer 248 also determines what information is inserted into the Insert and Track Information. For example, when the long play mode (LP) is selected, data in the ITI signal that indicates the length of the video data will indicate a greater length then in SP mode because the LP mode has more video data.

The mode processing microcomputer 248 is also in communication with the mechanical control microcomputer 236, which controls the mechanical components of the digital VCR 104 according to the mode designated by the mode processing microcomputer 248. For example, in a recording mode, the mechanical control microcomputer 236 controls the heads 254a and 254b to engage the recording medium while causing the recording tape to pass beneath the heads.

Figure 12:
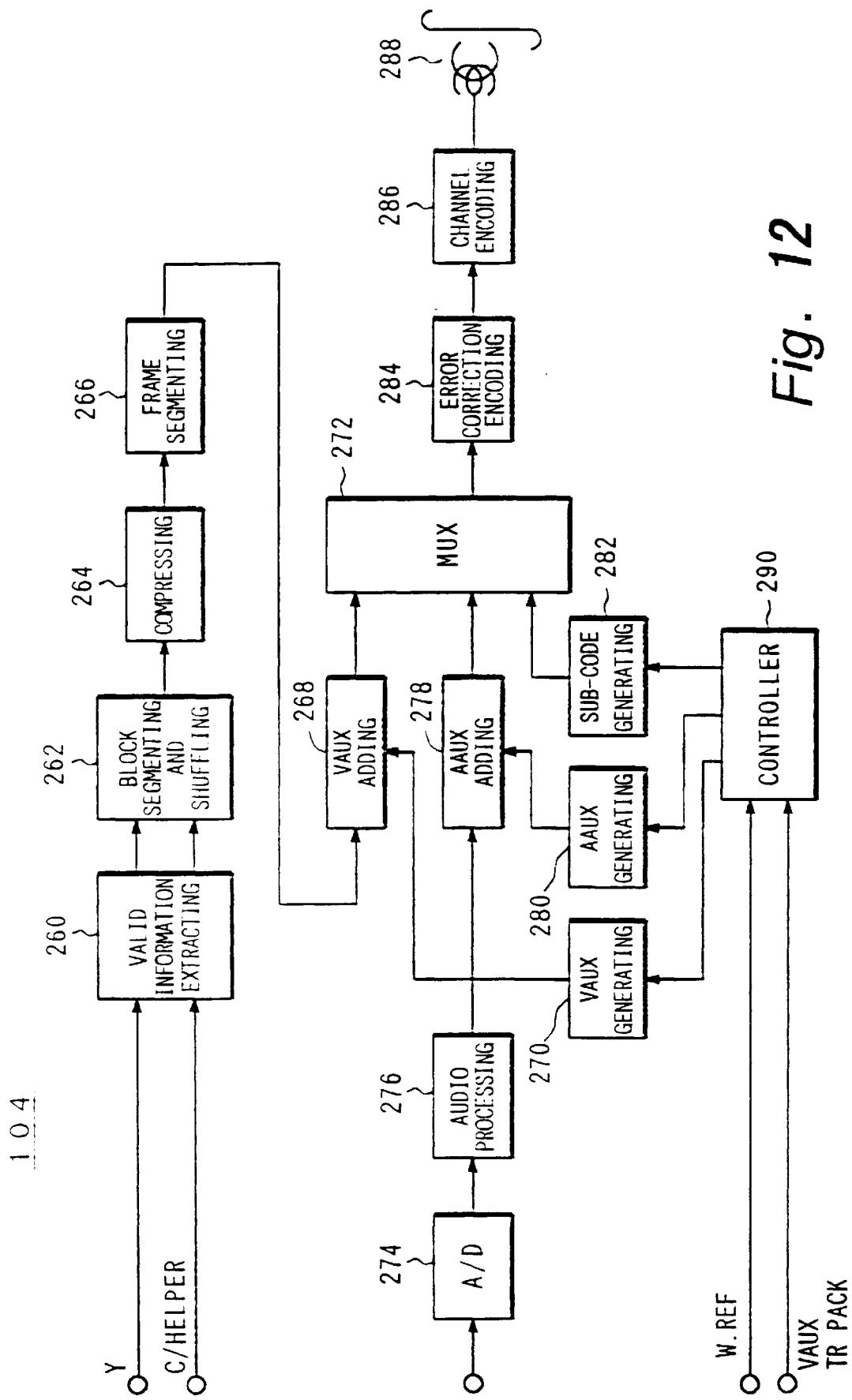
FIG. 12 is a block diagram of a record side digital VCR according to the second embodiment.

According to the second embodiment of the present invention, the digital VCR 104 can be constructed as shown in FIG. 12. In this embodiment, the video information is extracted from the luminance signal Y and the color signal C/HELPER by a valid information extracting circuit 260. The valid information extracting circuit extracts data in the interval of the valid screen (i.e., lines 23 to 310 and 336 to 622) and removes data in the other parts of the screen, such as in the vertical blanking and horizontal blanking intervals. The extracted information is then sent to a block segmenting and shuffling circuit 262 which segments the information into blocks and shuffles them, similar to the blocking and shuffling circuits 204, 206 of the first embodiment. A compressing circuit 264, similar to the first embodiment, performs the data compression using a DCT compressing technique. A frame segmenting circuit 266 frames the video data, and a VAUX adding circuit 268 adds the video data to VAUX data generated by the VAUX generating circuit 270. The framed video data combined with the VAUX data is then sent to the multiplexor 272.

The audio data is similarly processed and sent to the multiplexor 272. The audio data is input to an analog-to-digital converter 274 and outputs the digital result to an audio processing circuit 276. The audio signal processing circuit 276 packs the audio data into a predetermined audio sync block and outputs the sync block to an AAUX adding circuit 278. The AAUX adding circuit 278 adds AAUX data generated from the AAUX generating circuit 280 to the audio sync block and outputs the result to the multiplexor 272.

A sub-code generating circuit 282 generates subcode data, which is used to search through the recording medium for predetermined portions of the video picture.

The controller 290 receives the white 100% reference signal and the VAUX TR pack. From these signals, the controller 290 controls the VAUX generating circuit 270, the AAUX generating circuit 280 and the subcode generating circuit 282.

The multiplexor 272 selects one of the video data, the audio data, or the subcode data. When, for example, video data is to be written to the recording medium, the multiplexor 272 selects the output from the VAUX adding circuit 268. The output of the multiplexor 272 is sent to an error correction encoding circuit 284, which adds a parity to the multiplexed signal, as described in the first embodiment. The error corrected signal is then channel encoded by a channel encoding circuit 286 which performs a 24 to 25 conversion and also encodes the recorded signal corresponding the partial response class 4 suitable for digital recording. The encoded signal is then sent to the recording head 288 to be transferred to a recording medium.

Figure 13:
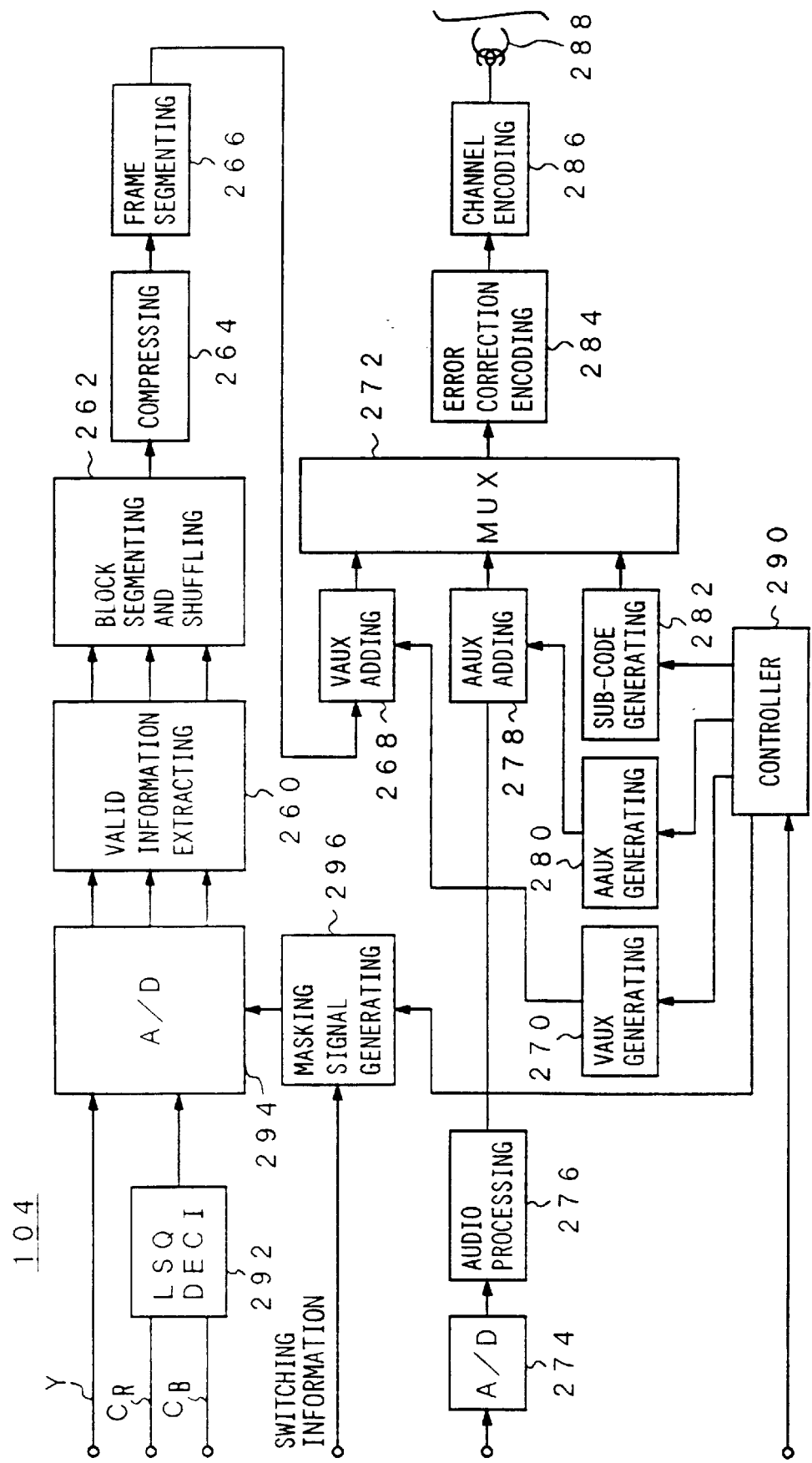
FIG. 13 is a block diagram of a record side digital VCR according to the third embodiment.

The digital VCR 104 of the third embodiment is similar to that of the last embodiment except that the digital VCR of embodiment masks the video data. As shown in FIG. 13, a masking signal generating circuit 296 causes the analog-to-digital circuit 294 to mask-out line 23, which corresponds to the WSS signal. As discussed, line 23 is within the scanning portion of the television screen (i.e., not in the vertical blanking interval) and would be processed as a luminance signal Y. Since the WSS signal has high frequency components, processing this signal as a luminance signal Y would degrade the DCT compression process. Thus, a masking signal generating circuit 296 is provided, which causes the analog-to-digital circuit 294 to set line 23 to a pedestal level. Since, the analog-to-digital circuit 294 requires a 4:2:0 input, a line sequence decimation circuit 292 is placed before the analog-to-digital circuit 294 to combine the color difference signals $C_B, C_R$. With this arrangement, the WSS signal is masked out of the PAL plus video signal and DCT compression is not degraded.

Recording Medium Data Format

Figures 14A, 14B:
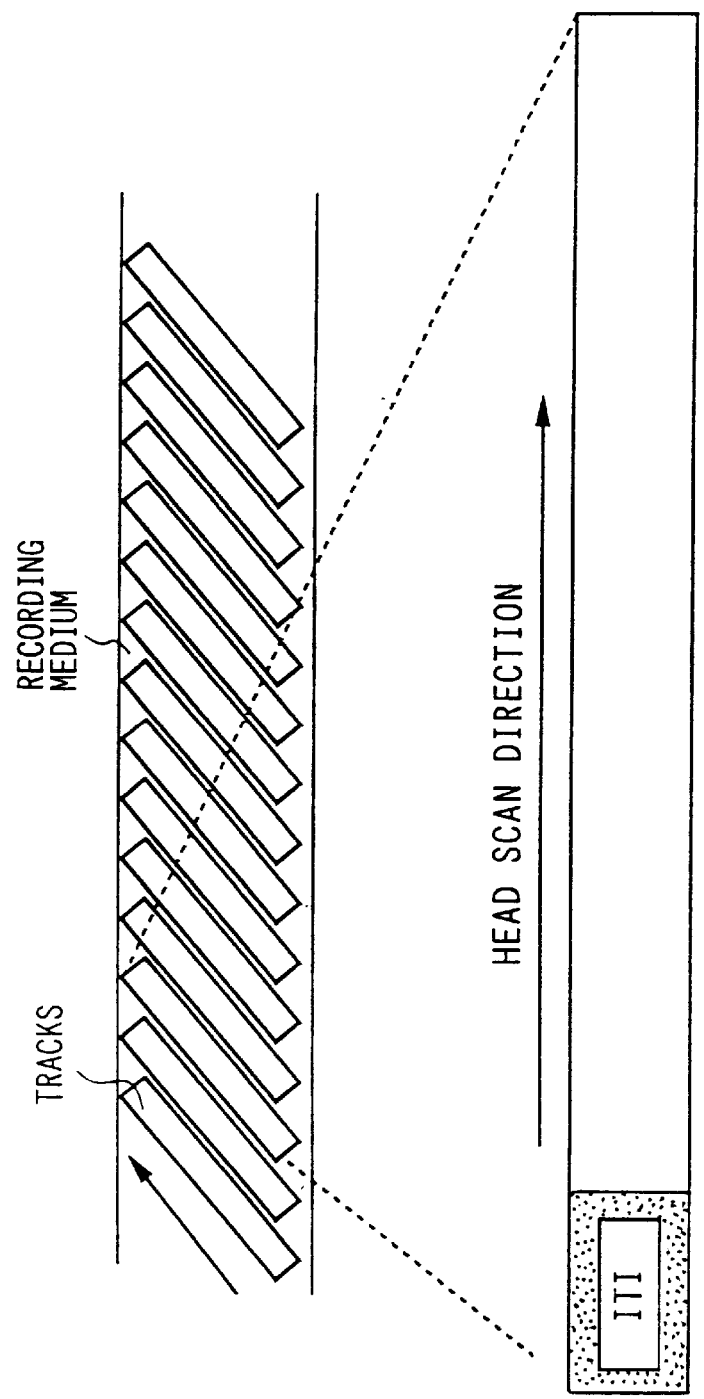
FIGS. 14A and 14B depict recording tracks disposed on a recording medium and a recording track with an Insert and Track Information (ITI) header, respectively.

The digital VCR 104, thus, records the audio and video data as sync blocks into tracks along a recording medium, such as a video tape. As shown in FIG. 14A, the tracks are recorded onto the recording medium using a helical recording technique, wherein a rotary magnetic head spins adjacent to the video tape while the video tape travels along a head scan direction. FIG. 14B shows that each track is headed by an Insert and Track Information (ITI) header, which includes information for aligning the data which follows. For example, as shown in FIG. 14C, the ITI header indicates where the audio area, video area and subcode area begins.

Figure 15:
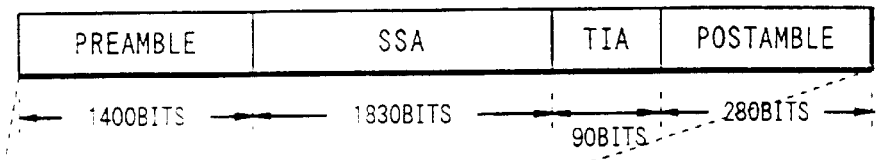
FIG. 15 depicts the contents of the ITI block.

The ITI area includes different bits of information, as shown in FIG. 15. The ITI area begins with a preamble which is comprised of 1400 bits and is used as run-in when the magnetic head reproduces a digital signal. The preamble is followed by a Start Sync Block Area (SSA) which is 1830 bits and designates the start of a sync block area. The ITI then includes 90 bits of Track Information Area which stores information about all of the tracks. Included in the TIA is an Application ID of a Track (APT) of three bytes, a SP/LP flag, a reserve byte and a Pilot Frame (PF) which represents a reference frame of the servo system. The TIA is followed by the postamble composed of 280 bits, used to provide a margin at the end of each track.

Figure 16:
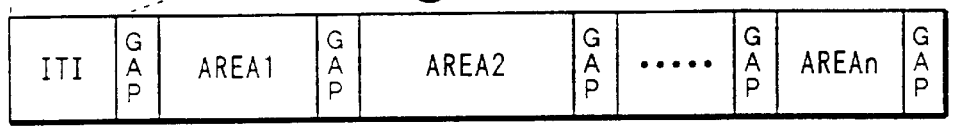
FIG. 16 depicts a track with an ITI header and areas separated by gaps.

The remainder of the track is allocated among areas (AREA 1, AREA 2 . . . AREA n) separated by gaps (FIG. 16). As shown in FIG. 14C, the areas may be audio, video or sub-code areas. The ITI indicates where these areas begin and end and the digital VCR 104 employs the ITI to quickly find and retrieve the desired area.

Figure 17:
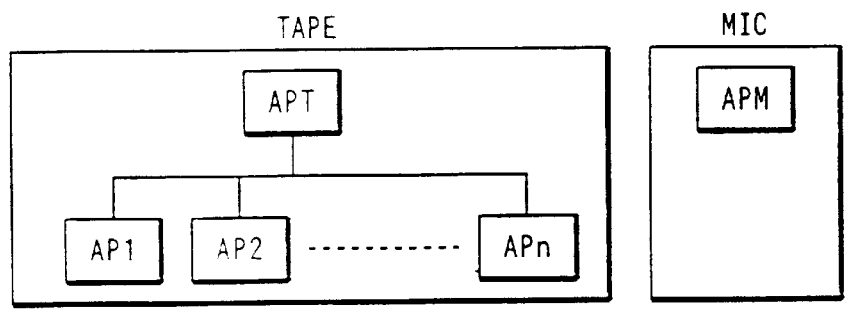
FIG. 17 depicts the hierarchy of application ID's stored on the tape and the memory IC (MIC) of the video cassette.

The application ID (APT) stored in the TIA designates the different areas as being video, audio or sub-code areas. As shown in FIG. 17, the application ID (APT) can be an hierarchy of application Ids, as shown in FIG. 17. With such an hierarchical structure, whole branches including several areas of the tree can be extracted by the digital VCR 104. In this manner, areas corresponding to a video picture can be linked to each other for ease of reproducing the video picture.

The cassette housing of the video tape preferably includes a memory IC (MIC). The MIC of the cassette is in communication with the digital VCR 104 and can be employed to remember aspects relating to all of the recorded programs on the video tape. For example, the MIC can mark a predetermined program, designate the reproduction order of programs, designate a predetermined scene for reproducing a still image (i.e., a photo), and reserve a timer record operation.

The MIC also has an Application ID (APM) as shown in FIG. 17 which is located in the high order 3 bytes of the MIC. Similar to the Application ID of the tracks, the APM determines the data structure of the MIC.

Figure 18A:
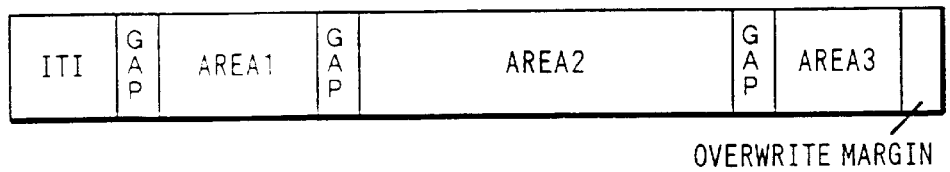
FIGS. 18A and 18B depict the areas of a track allocated to audio, video and sub-code area.
Figure 18B:
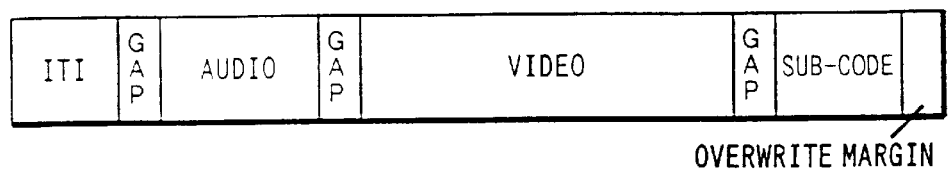

As an example of the application ID designated different areas of the track, reference will be made to FIGS. 18A and 18B. When the application ID for each of the areas AP1, AP2 and AP3 are set to 000, the areas shown in FIG. 18A are designated as audio, video and sub-code areas as shown in FIG. 18B. Of course, any digital representation for an application ID can be used to indicate the data structure.

Figures 19, 20:
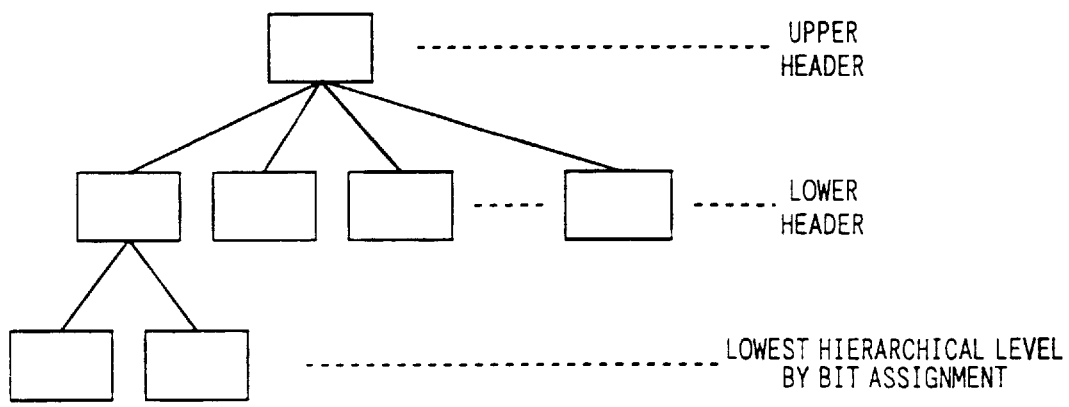
FIGS. 19 is a bit map of a data pack with a header and a data section including data from related areas.
FIG. 20 depicts an hierarchy for headers of different data packs.

The digital VCR 104 records the different data structures onto the recording medium in a specific format. The AAUX, VAUX, sub-code and MIC data relate to information about the video picture and are written in a pack structure shown in FIG. 19. As shown, a pack is composed of 5 bytes (PC0 . . . PC4) with the high order byte reserved as a header and the 4 lower bytes reserved for data. The high order 4 bits of the header can be used as an upper header and the lower order 4 bits of the header can be used as a lower header in an hierarchical structure as shown in FIG. 20. Further levels can be created by using the bits in the data area (PC1 . . . PC4). Each pack is fixed in length to 5 bytes. However, when data is written to the MIC, a variably lengthed pack structure is employed because the MIC is a buffer and should be used to capacity to obtain the most efficient use of the buffer.

When PC0 is set to 66h as shown in FIGS. 21A and 21B, the data pack is designated as a TR pack. The TR pack is an important data pack because the pack includes video picture information, such as the WSS signal and the white 100% reference signal. As shown in FIG. 21A, the TR pack can include information on the VBID, EDTV-2 ID on line 22 and EDTV-2 ID on line 285. For example, the data pack in FIG. 21B is designated as a TR pack because the byte PC0 is set to 66h and, since the data type (low order half-word of PC1) is set to 0001, the TR pack contains WSS data.

The TR pack is not limited to any particular arrangement, but may have other data arrangements. For example, FIG. 21C shows WSS data in PC2 and white 100% reference data in PC4. As discussed, the white 100% reference signal is transmitted during line 623, i.e., during a vertical interval, and must be stored in the TR pack because line 623 is not recorded by the digital VCR 104.

Other types of data packs are shown in FIGS. 22A and 22B. FIG. 22A shows a source pack of the VAUX data that stores the color phase information. In this source pack, PC2 stores a color frame ID code (CLF), which is defined as follows:

00=first and second fields
01=third and fourth fields
10=fifth and sixth fields
11=seventh and eighth fields FIG. 22B shows a source control pack of the VAUX data, as designated by 61h stored in PC0. PC2 stores a display select mode (DISP), which defines an aspect ratio of the video picture. The aspect ratio defined by the display select mode can be defined as follows:

000=4:3 normal
001=4:3 letter box
010=16:9

The audio data is stored on the recording medium as sync blocks. As shown FIG. 23, the digital VCR frames a preamble, an audio sector and a postamble into the audio sync block. The preamble includes a run-up of 400 bits and 100 bits of preamble information, including 6 bits of a pre-sync block. The audio sector is composed of 10,500 bytes, which represent the sound synchronizes with the video picture. The postamble includes 6 bytes of a post-sync block and 500 bits of a guard area, the guard area being provided to prevent the audio data from overlapping into the next video sector.

Figure 24A:
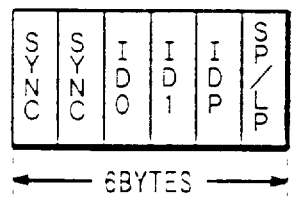
FIGS. 24A and 24B are bit maps of the pre-sync block and the post-sync block, respectively, shown in FIG. 23.
Figure 24B:
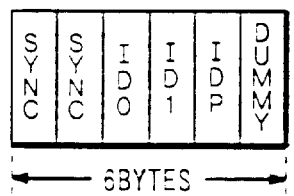
Figure 24C:
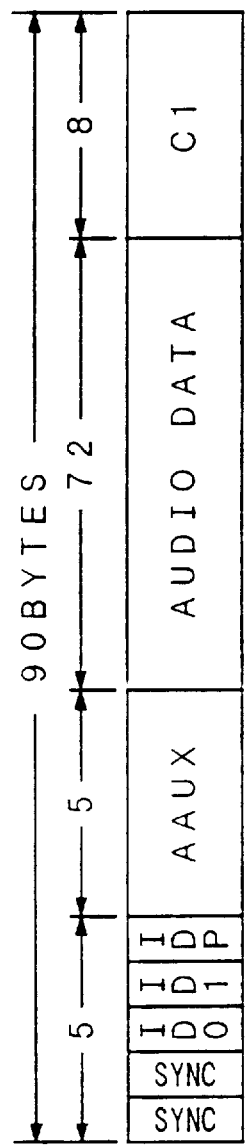
FIG. 24C is a bit map of the audio data arranged into a sync block for storage into a data pack.

The pre-sync block and the post-sync block are shown in detail and FIGS. 24A and 24B. The pre-sync block is shown as having 6 bytes, but the SP/LP byte, which indicates whether a short play SP or a long play LP mode is selected, is also stored in the TIA area of the TR pack (FIG. 15) and may be omitted from the pre-sync block. Both the pre-sync and post-sync blocks contain two sync bytes, followed by three identification bytes (ID0, ID1 and IDP). The post-sync block, unlike the pre-sync block, stores a dummy byte in the sixth byte of the block. The audio sync block may also include the parity sector C1 shown in FIG. 24C. The parity sector C1 is known as a horizontal parity because C1 assists the digital VCR 104 in detecting areas in the data of the current audio sync block. The parity sector C2, on the other hand, is known as a vertical parity because C2 assists the digital VCR 104 to determine errors in the sync blocks arranged in the vertical direction (FIG. 25A).

Figure 25A:
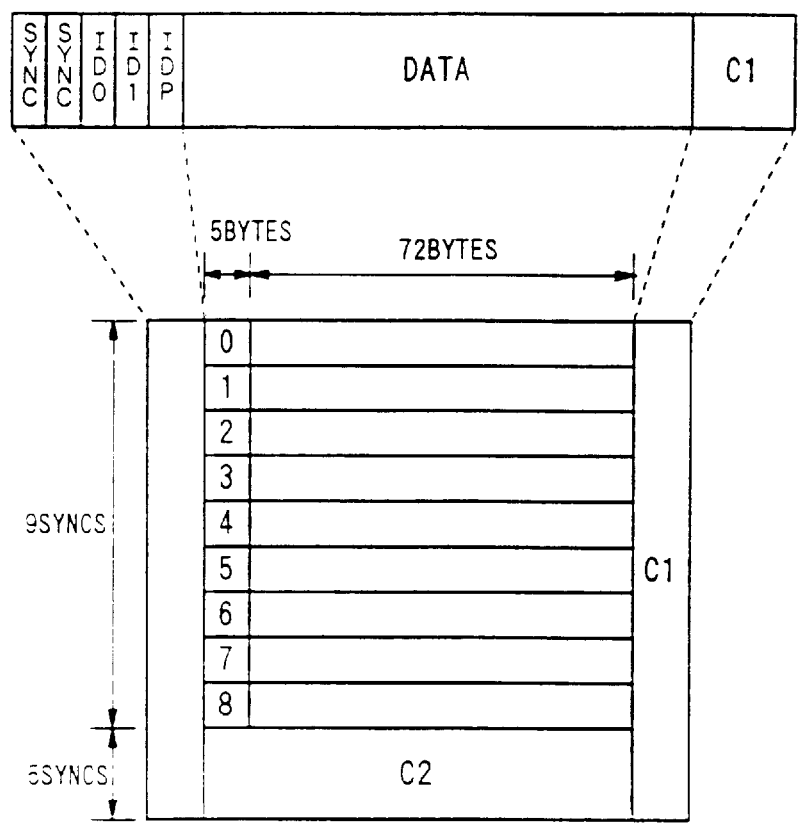
FIGS. 25A and 25B depict sync blocks stored as a data pack.
Figure 25B:
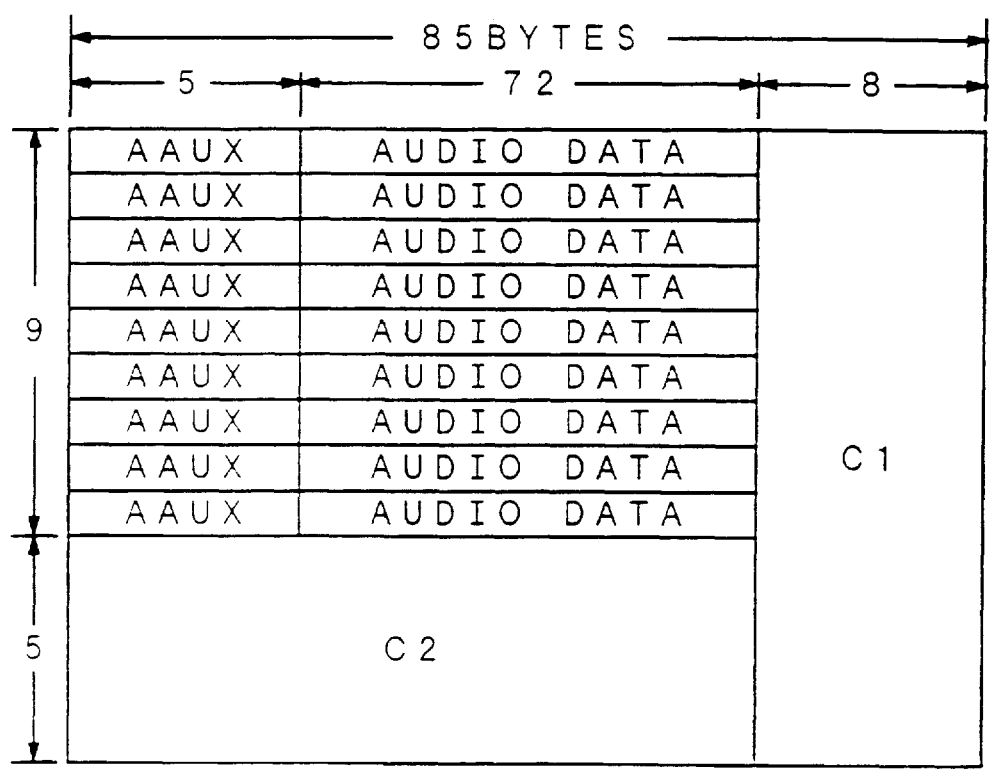

The audio sync blocks are collected and stored on the recording medium in groups of 14 sync blocks per track as shown in FIG. 25A. As shown in FIG. 25B, the first five bytes of the data sector is reserved for the AAUX data. The first nine audio sync blocks of each group contains audio information, whereas the last five sync blocks is reserved for the horizontal and vertical parities C1 and C2, respectively. Recalling that the digital VCR 104 performs a "24 to 25" conversion prior to the recording of the signal, the total bit length of the group of 14 sync blocks per track is calculated as follows:

$$90 \times 14 \times 8 \times 25 \div 24 = 10{,}500 \text{ bytes}$$

Figure 26:
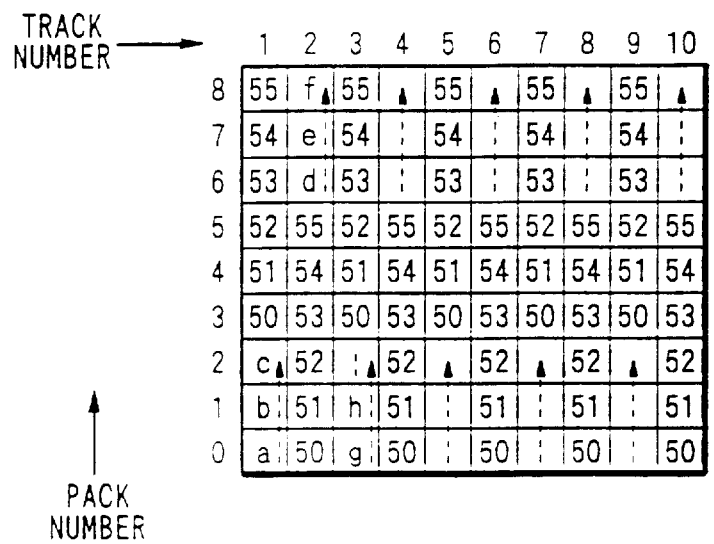
FIG. 26 is a schematic diagram showing the arrangement of data packs in each track of the recording medium.

The digital VCR 104 records the data packs, comprising the 14 audio sync blocks, onto the recording medium in the manner shown in FIG. 26. As shown, packs 50 to 55 are stored in each of the tracks 1 to 10, starting at different pack numbers along each track. The packs are arranged in this manner and repeated throughout tracks 1 to 10 in order to ensure that the information in each data pack is recovered upon a reproducing operation. Additional areas (a to g) are available for storing other data packs as required. With this arrangement, recovery of the audio data is ensured even if a portion of the recording medium is corrupted.

The video data is also stored in sync blocks as shown in FIG. 27A. As in the previous case, the video sync block includes a preamble, a video sector and a postamble. Since video data is more comprehensive than audio data, more bytes are required in the video sync block than the audio sync block for the preamble, video sector and postamble, as indicated by the bit designations in FIG. 27A. Specifically, the video sector is 111,750 bits (versus 10,500 bits of the audio sector) and the guard area is 925 bits versus 500 bits of the audio guard area). The guard area of the video sync block is larger than in the audio sync block because video data tends to be larger than audio data and more guard bits are required to ensure that the video data does not overlap into adjoining areas of the recording medium. The video sync block may also include the parity sector C1 shown in FIG. 27B.

Figure 28:
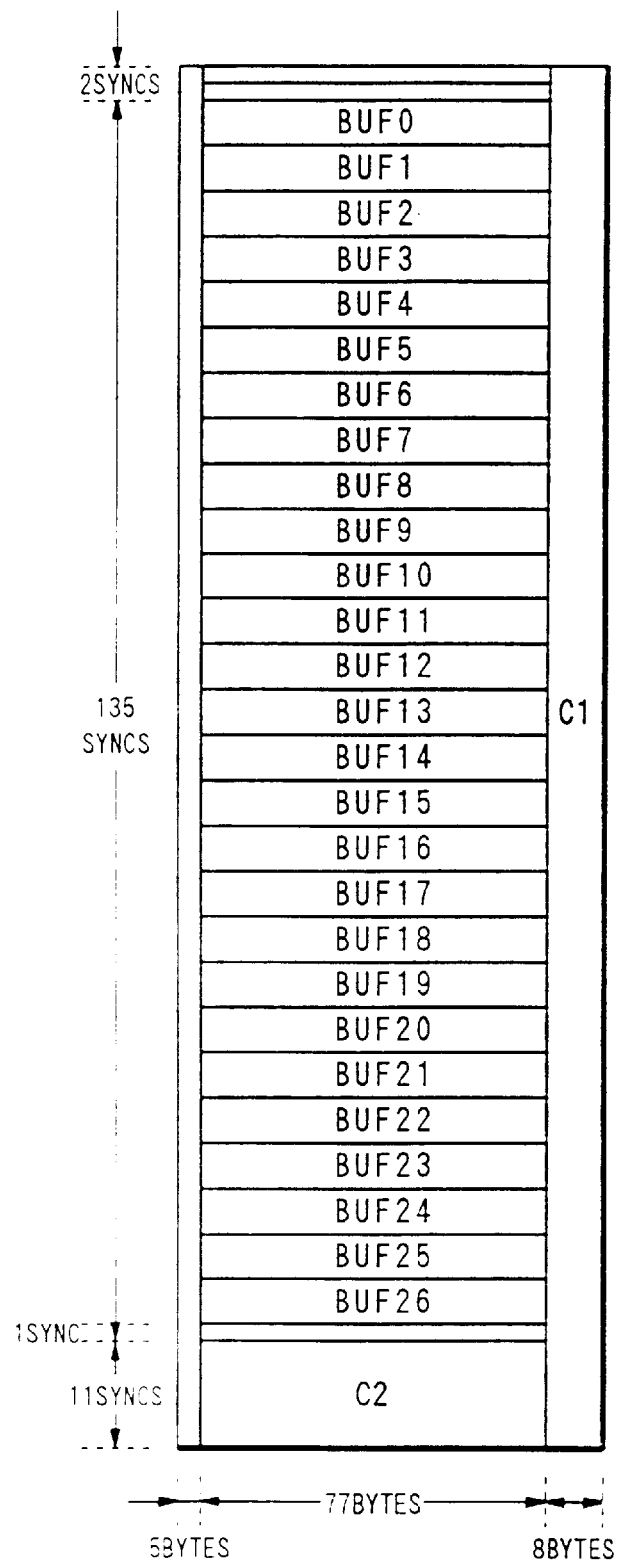
FIG. 28 depicts the sync blocks grouped into buffering units and arranged vertically on the recording medium.

As shown in FIG. 28, each track on the recording medium stores the video sync blocks in units of buffers (BUFF 0 to BUFF 26). Each buffer contains five video sync blocks for a total of 135 video sync blocks in each track. As in the audio data pack, a horizontal parity C1 and a vertical parity C2 are provided with each track to ensure that the digital VCR 104 will accurately reproduce the stored video data. The first two sync blocks, the first five bytes of each sync block and the sync block, after the last buffer (BUFF 26) are left blank to provide margins so that the reproducing head of the digital VCR 104 can be accurately aligned with the appropriate video sync blocks.

As in the audio sync block, the video sync block is converted by a "24 to 25" conversion process by the digital VCR 104 before being recorded on the recording medium. After the conversion, the total bit length of the video sector is as follows:

$$90 \times 149 \times 8 \times 25 \backslash 24 = 111{,}750 \text{ bits}$$

Thus, the digital VCR 104 records the PAL plus signal as data packs, audio and video sync blocks, and sub-code sync blocks.

Figure 29:
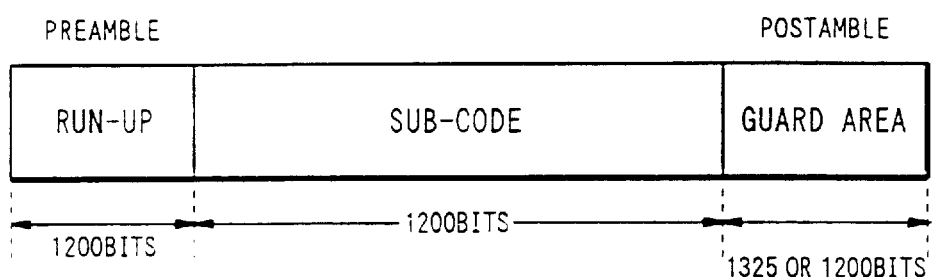
FIG. 29 is a bit map of a sub-code sector used for searching the contents of the recording medium.
Figure 30:
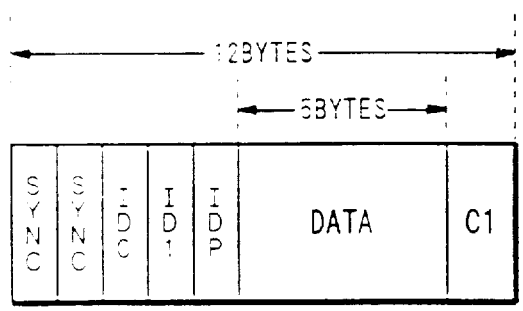
FIG. 30 is a bit map of the sub-code area shown in FIG. 29.
Figure 31A:
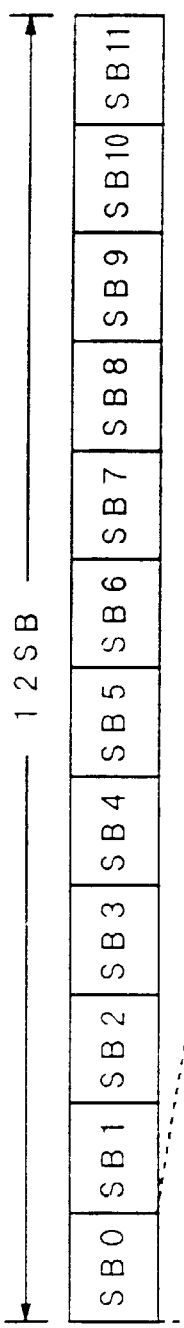
FIGS. 31A to 31D are bit maps of the sub-code sync block.
Figure 31B:
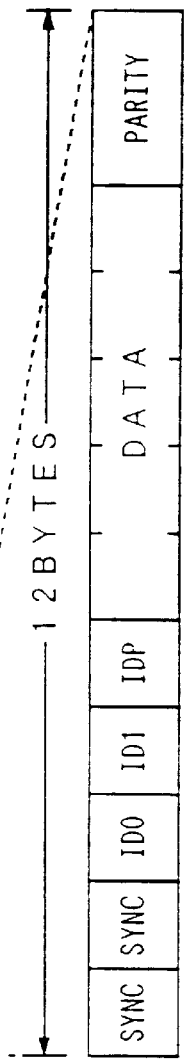

Subcode data is also stored on the recording medium in a data pack arrangement. As shown in FIG. 29, a subcode sync block includes 1200 bits of a preamble, 1200 bits of subcode data and 1325 or 1200 bits of a postamble. Unlike in the audio and video sync blocks, the preamble of the subcode sync block does not have a pre-sync block and the postamble of the subcode sync block does not have a post-sync block. This is because the subcode sector is frequently rewritten for indexing during a search and updating the pre-sync and post-sync blocks each time be time consuming. On the other hand, FIG. 30 shows a subcode sync block with a pre-sync block, a data section and a parity C1. Each track may contain 12 subcode sync blocks as shown in FIG. 31A. Each of the sync blocks is composed of 12 bytes with 5 bytes of a pre-sync block, a data block and a parity C1 as shown in FIG. 31B.

Figure 31C:
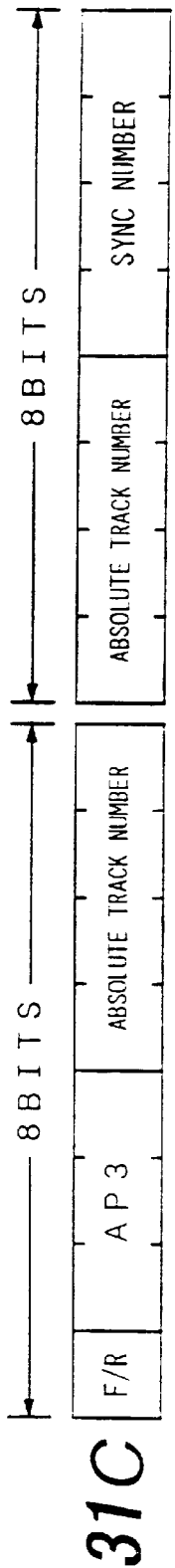
Figure 31D:
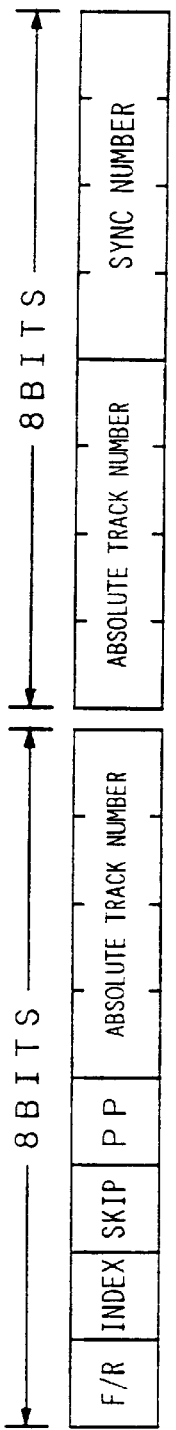

The sub-code data sector includes information for assisting the digital VCR 104 during a search of the programs on the recording medium and, therefore, requires only a small number of bits. An F/R flag for detecting an address during the high speed search operation is stored, for example, in ID0 of FIGS. 31C and 31D. As shown in FIG. 31C, sync blocks SB0 and SB6 each have an application ID (AP3) that represents the structure of data in the sub-code sector. Absolute track numbers in FIGS. 31C and 31D are disposed in ID1 which indicates the track number to which the sub-code sector corresponds. The ID0 bit of FIG. 31D further includes an index ID (index), a skip ID (skip), and a photo picture ID (PP).

The sub-code sync block is also converted by a "24 to 25" conversion process of the digital VCR 104 and the total bit length of the sub-code sector is as follows:

12×12×8×25/24/=/1200 bits

PAL Plus Signal Reproduction

Figure 32:
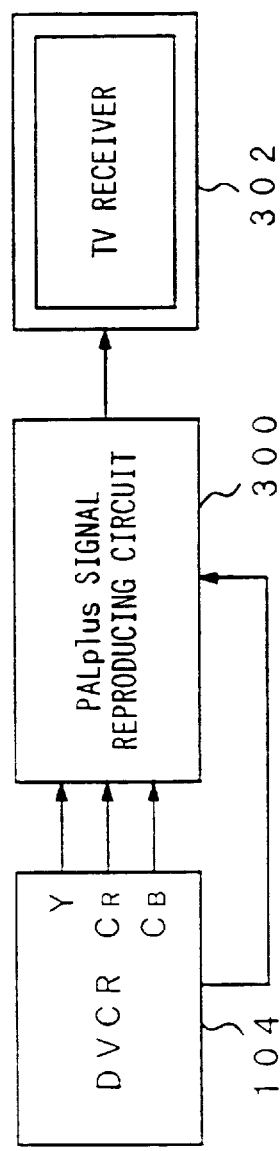
FIG. 32 is a block diagram of a reproducing side PAL plus encoder.

FIG. 32 is a block diagram depicting reproduction of the PAL plus signal from a recording medium. As shown, the digital VCR 104 outputs the luminance signal Y, the color difference signals $C_B, C_R$ and information signals (WSS signal, white 100% reference signal . . . ) to the PAL plus signal reproducing circuit 300. The PAL plus signal reproducing circuit 300 encodes the signals from the digital VCR 104 and outputs the reconstructed PAL plus signal to the television receiver 302 to be generated into a video picture for viewing.

Digital VCR Reproduction

Figure 33A:
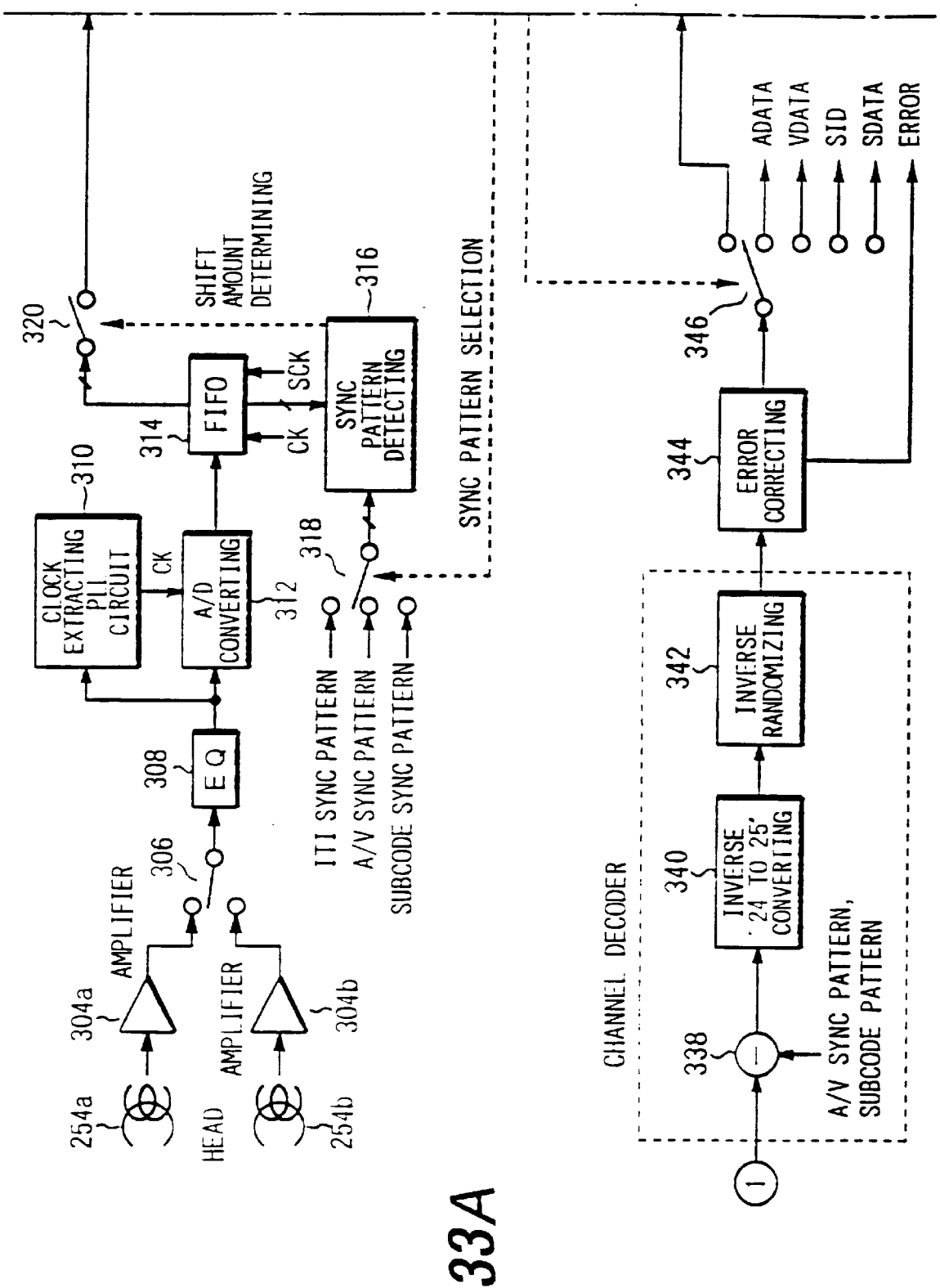
FIGS. 33A to 33C are block diagrams of a reproducing side digital VCR according to the first embodiment.
Figure 33B:
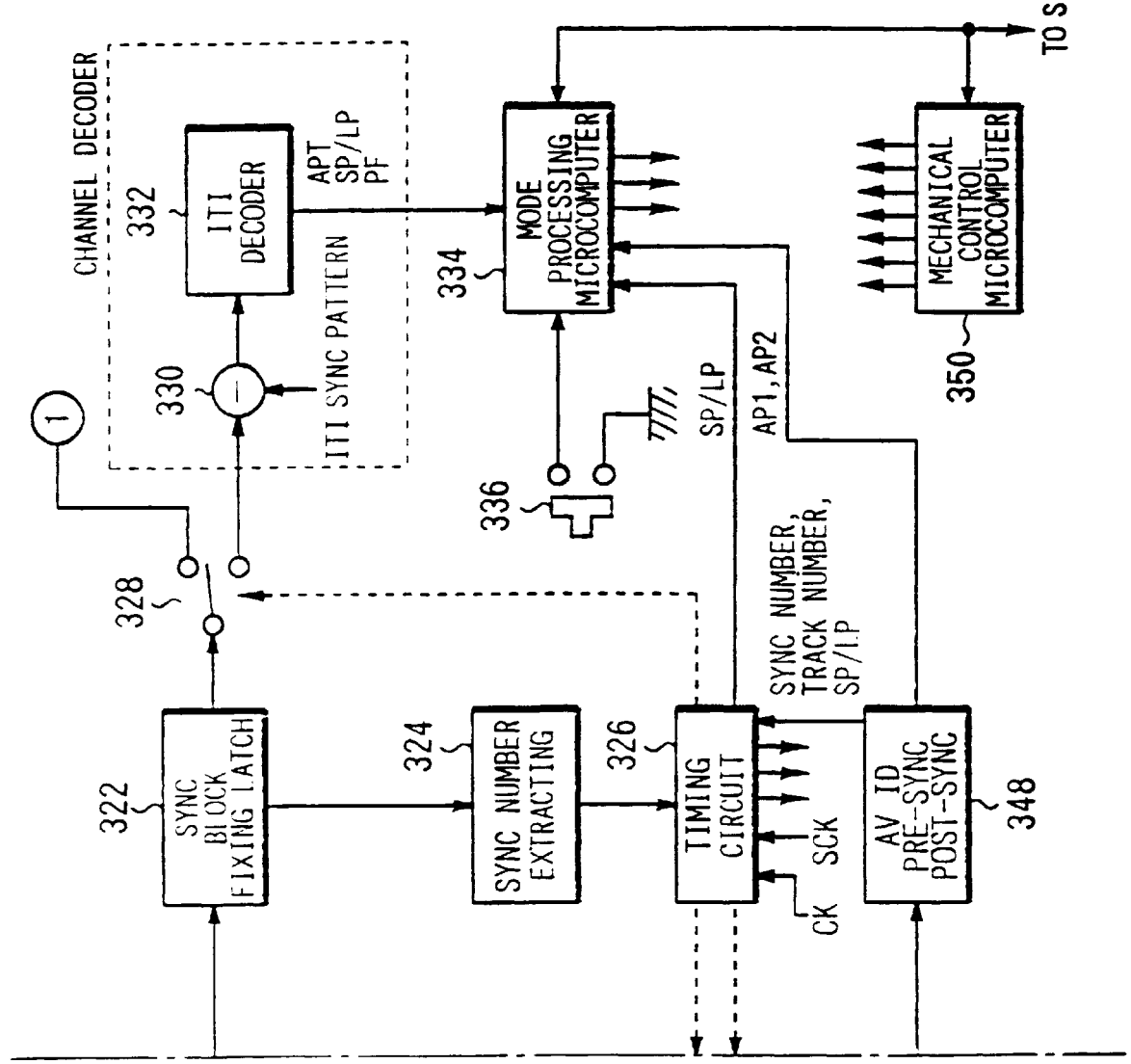

FIG. 33A is a block diagram depicting reproduction of the signals from the recording medium by the digital VCR according to the first embodiment. The digital VCR reproduction process is symmetrical to the recordation process and a detailed discussion of the digital VCR is deferred to the recording sections.

The heads 254A and 254B retrieve the recorded signals from the recording medium and output the retrieved signals to amplifiers 304A and 304B for amplification. The outputs of the amplifiers are ultimately switched by switch 306 in synchronicity with a timing of the heads. The signal output from the signal 306 is output to a equalizer circuit 308 which compensates for various loses that take place in the magnetic recording/reproducing operations. A clock extracting PLL circuit 310 extracts a clock signal from the equalizer output signal and causes the analog to digital converting circuit 312 to digitally convert the equalized signal corresponding to the extracted clock. The digitized signal is serially output to a FIFO memory 314, which stores the digitized signals in a first-in first-out manner. In this manner, the signals recorded on the recording medium are stored in the FIFO memory 314.

The signals are recorded in the FIFO memory in data packs and sync blocks, as described in the digital VCR recording process, and must be resequenced into coherent data. To that end, a sync pattern detecting circuit 316 receive sample sync patterns corresponding to an ITI sync pattern, an audio/video sync pattern and a subcode sync pattern through switch 318. The sync pattern detecting circuit 316 compares the sync blocks stored in the FIFO memory with the sample sync pattern and causes the switch 320 to output the sync blocks from the FIFO memory. The sync pattern detecting circuit 316 has a "fly wheel" structure and determines whether the same sync pattern is received after an interval of a predetermined sync block length. When the same sync pattern is received, for example, more than three times, it is determined that the received sync pattern is correct.

The sync pattern detecting circuit 316 determines the shift amount of the FIFO memory 314 in order to output the appropriate sync block. The data output from the FIFO memory 314 is sent through the switch 320 and to a sync block fixing latch 322, which latches the sync block. A sync number extracting circuit 324 extracts the sync number of the sync block latched by the sync block fixing latch and outputs the sync number to a timing circuit 326. The timing circuit control switch 318 and the appropriate sample sync pattern is sent to the sync pattern detecting circuit 316. The timing circuit also causes switch 346 to output the process sync block according to whether the sync block is audio data (A DATA), video data (V DATA), subcode identification/subcode data (SID, S DATA) or an error (ERROR).

When the sync block is audio, video or subcode data, the switch 328 outputs the sync block to the channel decoder (FIG. 33A). The pattern for the audio, video or subcode is subtracted from the sync block and the "raw" data is sent to the inverse "24 to 25" converting circuit 340, wherein the data is converted back to a 24-line format. The converted data is then ordered by the inverse randomizing circuit 342 and output to an error correcting circuit 344. The error correcting circuit 344 uses the horizontal and vertical parities stored in the audio/video and subcode data to detect an error and outputs an error signal if an error is detected in the parity. Otherwise, the audio, video, or subcode identification signal/subcode data is output to the switch 346. As discussed, the timing circuit causes the switch 346 to select the appropriate output according to the sync block stored in the sync block fixing latch.

On the other hand, when the sync block is information data (ITI) the timing circuit 326 causes the switch 328 to output the information data to the subtractor 330. The subtractor subtracts the ITI sync pattern from the information data and outputs the raw information to the ITI decoder 332. The information data is decoded and the application ID (APT), the short or long play mode (SP/LP), and the pilot frame (PF) is extracted therefrom.

The mode processing microcomputer 334 selects the mode of the digital VCR 104 based on the signals APT, SP/LP and PF, and on the basis of settings made on an external operation keypad 336. For example, the mode processing microcomputer 334 selects the reproducing mode on slow speed when the PLAY button is pressed and the SP/LP switch is set to the short play on the keypad 336. A mode processing microcomputer 334 compares the SP/LP signal from the ITI decoder 332 and the setting of the SP/LP switch and produces a warning if the SP/LP setting on the keypad 336 does not agree with the ITI data. The mode processing microcomputer 334 also receives the SP/LP signal from the pre-sync block output from the audio/video ID, pre-sync, post-sync circuit 348 and compares this SP/LP signal to the other SP/LP signals from the keypad 336 and the ITI data.

The SP/LP data obtained from the ITI data is written three times so that it is correctly detected by a "rule of majority" test. Moreover, the SP/LP information is written in four syncs of the audio sector, four syncs of the video sector and is also detected using a "rule of majority" test. In practice, the SP/LP information in the ITI data is most reliable and used when there is a discrepancy between the signals.

Figure 33C:
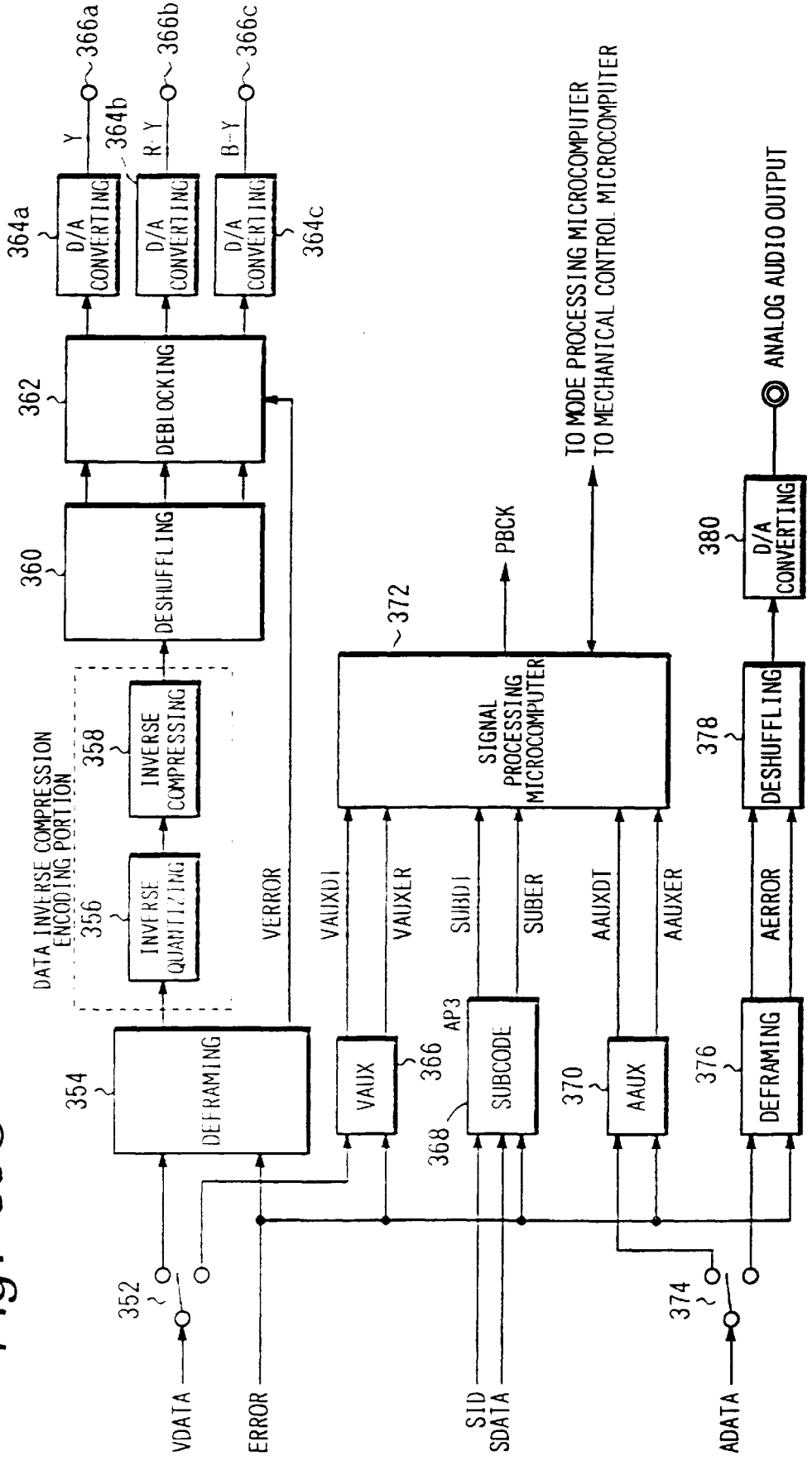

The mode processing microcomputer 334 is also in communication with the mechanical control microcomputer 350 and the signal processing microcomputer 372 (FIG. 33C). The mechanical control microcomputer 350 controls the mechanical components of the digital VCR 104 according to the selected mode. For example, the mechanical control microcomputer 350 engages the heads of the digital VCR 104 to the video tape when a reproducing mode is selected by the mode processing microcomputer 334. The signal processing microcomputer processes the AAUX and SUB-CODE data according to the mode selected by the mode processing microcomputer. The mechanical control microcomputer 350 also controls the mechanical components of the digital VCR 104 based on the signal processing microcomputer operations. For example, the mechanical control microcomputer fast-forwards the video program during a search conducted by the signal processing microcomputer and halts the fast-forward when the index value of the subcode data (FIG. 31D) corresponds to the desired point in the program.

Thus, the VDATA, ERROR signal, subcode ID signal (SID), the subcode data (SDATA) and the ADATA are sent to the circuits of the digital VCR 104 shown in FIG. 33C. The VDATA is output to the deframing circuit 354 from switch 352 when the VDATA corresponds to the actual video picture data. On the other hand, the VDATA is output from the switch 352 to the VAUX circuit 366 when the VDATA corresponds to the video auxiliary data. The video data is output to the deframing circuit 354 along with an error flag, and the video data is deframed. The deframed data is output to a data inverse compression encoding portion, while the error flag (VERROR) is output to the deblocking circuit 362. The deframed video data is inversed quantised by the inverse quantising circuit 356 and inverse compressed by the inverse compressive circuit 358. The decompressed video data is then sent to a deshuffling circuit 360, which deshuffles the data block and outputs the luminance signal Y and color difference signals $C_B, C_R$ to the deblocking circuit 362. The deshuffled signals are deblocked from 8×8 blocks into a video picture and output to digital-to-analog converting circuit 364a, 364b and 364c, where they are converted from digital to analog signals and output from the digital VCR 104.

The error flag is generated from the horizontal and vertical parity signals C1 and C2. The deblocking circuit 362 corrects the video data by, for example, interpolating the corresponding video data from adjacent portions of the video picture.

The audio data is similarly output from switch 374 to the deframing circuit 376 along with an error flag. The deframing circuit 376 deframes the audio data and outputs the same along with an audio error signal to the deshuffling circuit 378. The deshuffling circuit deshuffles the shuffled audio data and corrects the audio data according to the error flag. The deshuffled and corrected audio data is sent to a digital-to-analog converting circuit 380 to be converted from digital to an analog signal and output from the digital VCR 104.

The auxiliary data AAUX is output from the switch 374 to the AAUX circuit 370 along with an error flag. The audio information and error flag are processed and output from the AAUX circuit 370 to the signal processing microcomputer 372.

The subcode data, including the subcode ID (SID) and the subcode data (SDATA), are sent to the subcode circuit 368 along with an error flag. The subcode signals are processed and output to the signal processing microcomputer 372.

The VAUX, AAUX and the subcode data are multiply written to the recording medium (i.e., the data packs). The VAUX, AAUX, and subcode circuits pre-process the information signals according to a "rule of majority" with reference to the error flag supplied to each of the circuits. That is, the multiply written information is compared with itself and the majority of the multiply written data which agrees is chosen as the correct data.

Figure 34:
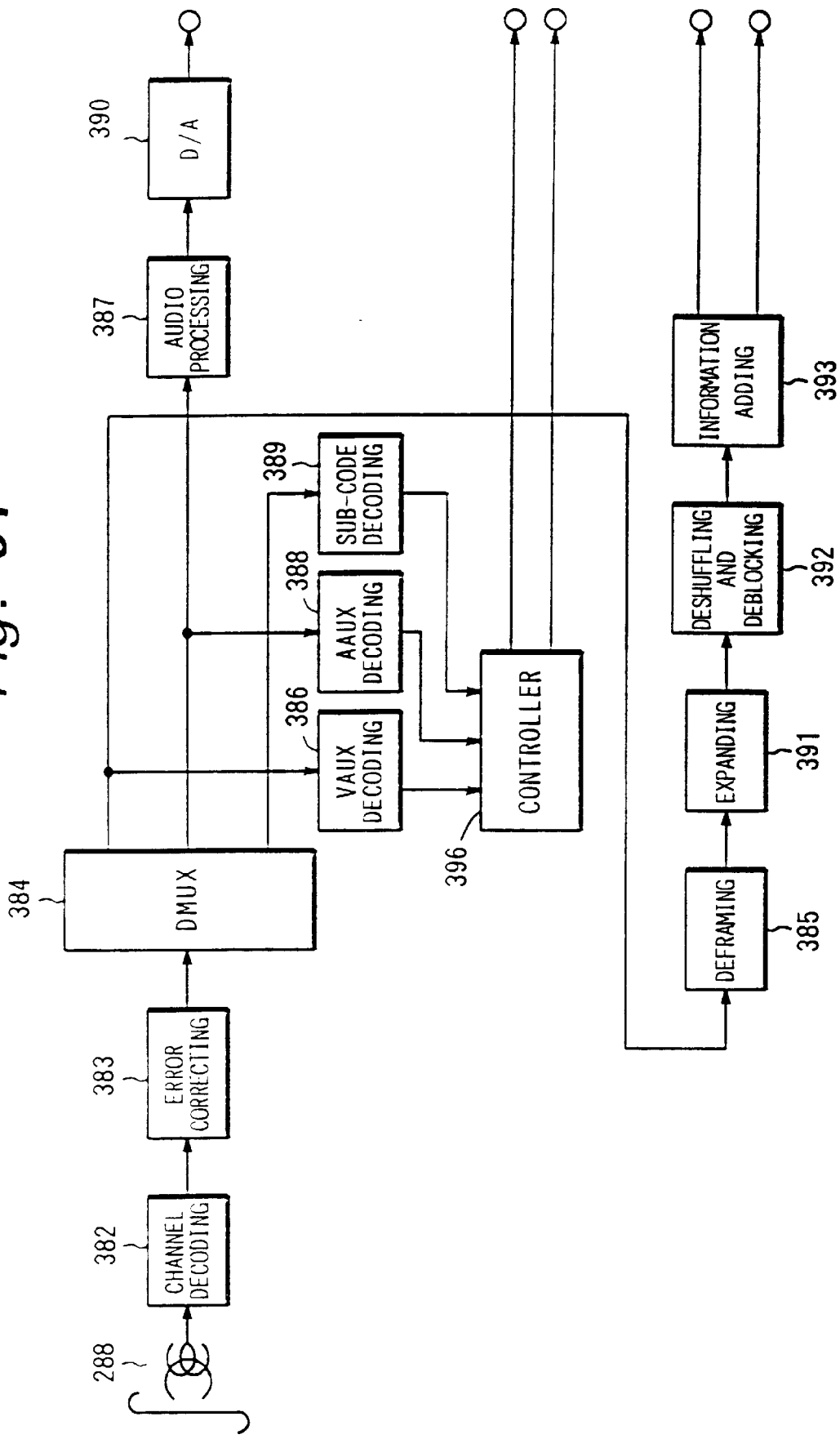
FIG. 34 is a reproducing side digital VCR according to the second embodiment.

FIG. 34 is block diagram depicting the reproducing section of the digital VCR 104. The head 288 reproduces a signal from the recording medium and outputs the signal to a channel decoding circuit 382. The channel decoding circuit 382 demodulates the reproduced signal and outputs the demodulated signal to an error correcting circuit 383. The error correcting circuit 383 performs an error correction process, such as an interpolation process, according to the horizontal and vertical parity data C1, C2. The error corrected signal is output to a demultiplexor 384 and is multiplexed to a video section, audio section or sub-code section depending upon the type of data sent to the demultiplexor.

When video data is sent to the demultiplexor 384, the video data is demultiplexed and output to the VAUX decoding circuit 386 and to a deframing circuit 385. The VAUX decoding circuit 386 extracts the VAUX data and outputs the auxiliary video information to the controller 396. The video data sent to the deframing circuit 385 is deframed and output to an expanding circuit 391. The expanding circuit 391 performs an inverse DCT process on the video data to decompress the video data. The decompressed video data is then deshuffled and deblocked by a deshuffling and deblocking circuit 392 in a manner similar to the deshuffling and deblocking circuits in the first embodiment. The deshuffled and deblocked video signal is output to the information adding circuit 393 as a luminance signal Y and a color signal C. The information adding circuit 393 adds a horizontal synchronous signal, a vertical synchronous signal, and so forth to the reproduction signals Y and C. The reconstructed luminance signal Y and color signal C are output from the reproducing section of digital VCR 104 and are now ready for encoding into a PAL plus video signal.

Figure 35:
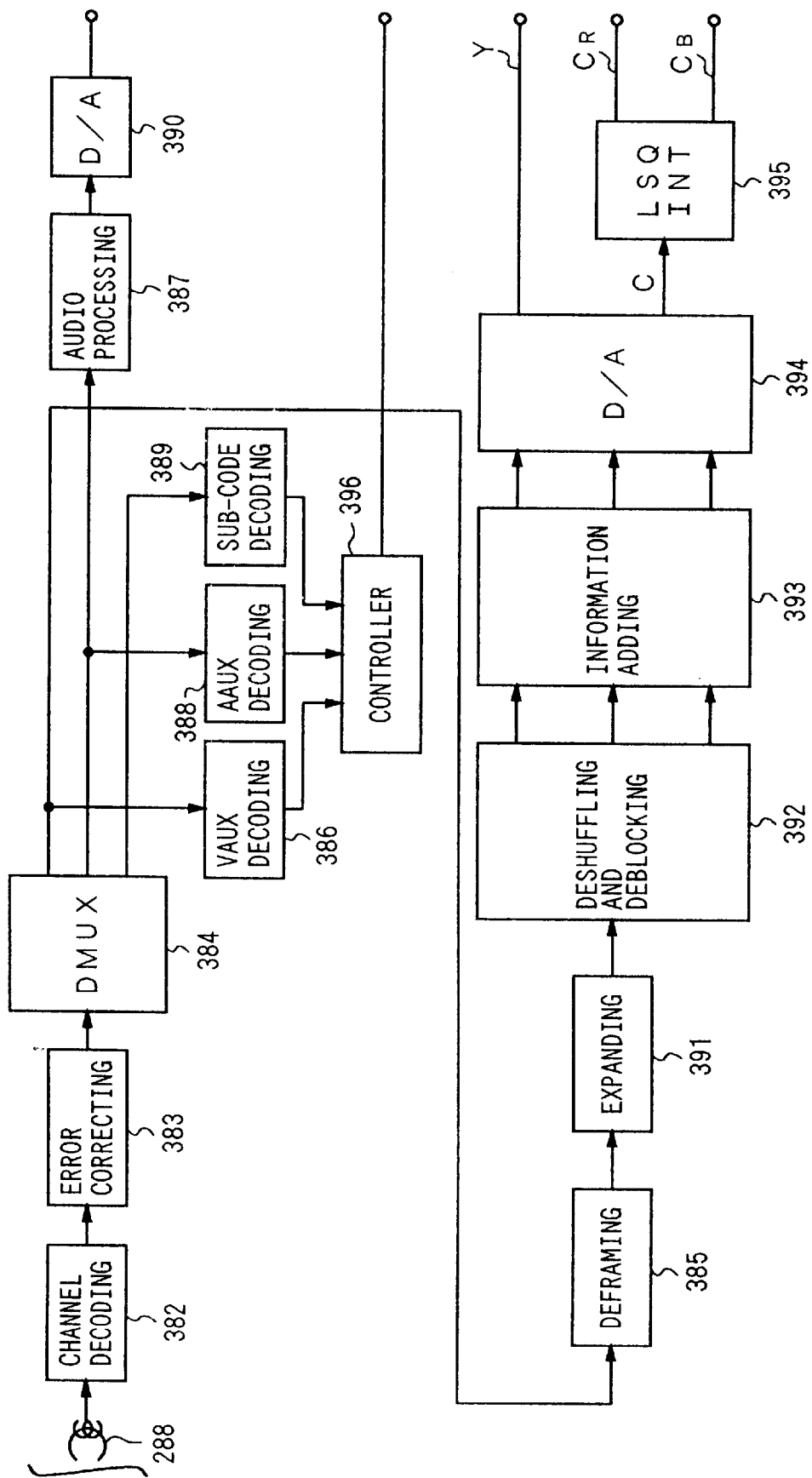
FIG. 35 is a reproducing side digital VCR according to the third embodiment.

FIG. 35 is a block diagram of a reproducing section of the digital VCR 104 according to the third embodiment of the present invention. The reproducing section of the third embodiment is generally the same as the recording section described in the second embodiment. The third embodiment, however, includes a digital-to-analog circuit 394, which converts the digital signals from the information adding circuit 393 into analog signals. The converted analog signals are then output as a luminance signal Y and color signal C. The color signal C is output to a line sequence interpolating circuit 395 which generates color difference signals $C_B, C_R$ from the color signal C.

PAL Plus Signal Reproducing Circuit

FIG. 36 is a block diagram depicting the PAL plus signal reproducing circuit 300 of FIG. 32 according to the first embodiment. As shown, the luminance signal Y and the color difference signals $C_B, C_R$ are output from the digital VCR to the PAL signal encoding circuit 400. The helper signal, which was recorded on the color difference signal $C_B$, is extracted by the helper signal modulating circuit 402 and output to the switch 410. The PAL signal encoding circuit 400 encodes the luminance signal Y and the color difference signals $C_B, C_R$ into PAL signals Y and C, respectively. The switch 410 outputs either the helper signal or the PAL encoded color signal C to the Y/C mixing circuit 412. The helper signal is selected by the switch 410 when the line counter 408 indicates that the lines of the video picture correspond to the helper signal (lines 24 to 59, 275 to 310, 336 to 371 and 587 to 622; FIG. 2A).

The digital VCR 104 also outputs a WSS signal from the signal processing microcomputer 372 (FIG. 33C) to the WSS encoder 404. The WSS signal is encoded by the encoder 404 and output to an adding circuit 406 and the line counter 408. The Y/C mixing circuit 412 regenerates the PAL plus video picture shown in FIG. 2A and outputs the video picture to an adder 406. The adder 406 adds the WSS signal to the PAL plus video picture on line 23 and the PAL plus reproducing process is complete.

Figure 37A:
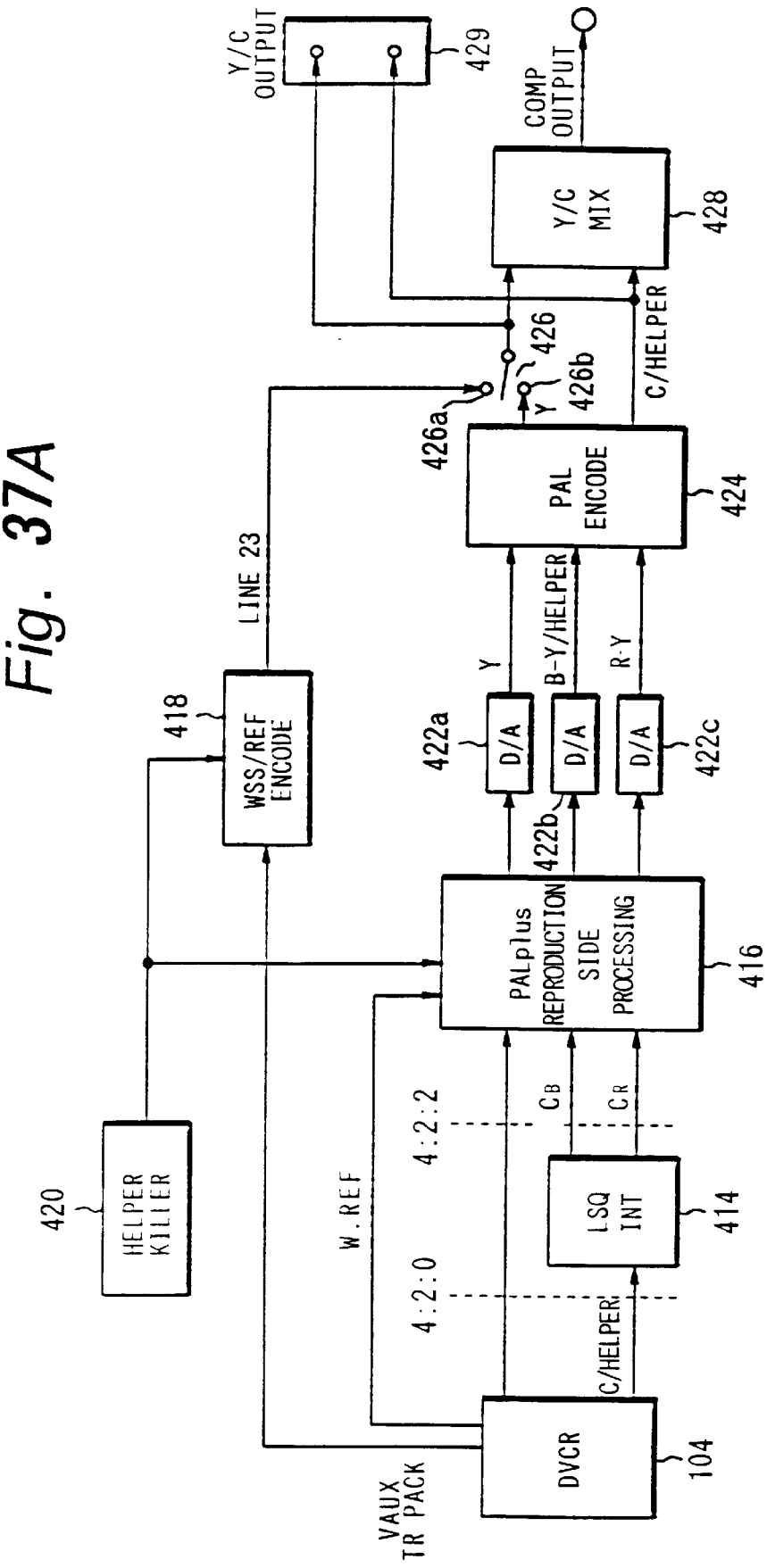
FIG. 37A is a PAL plus signal reproducing circuit according to the second embodiment.
Figure 37B:
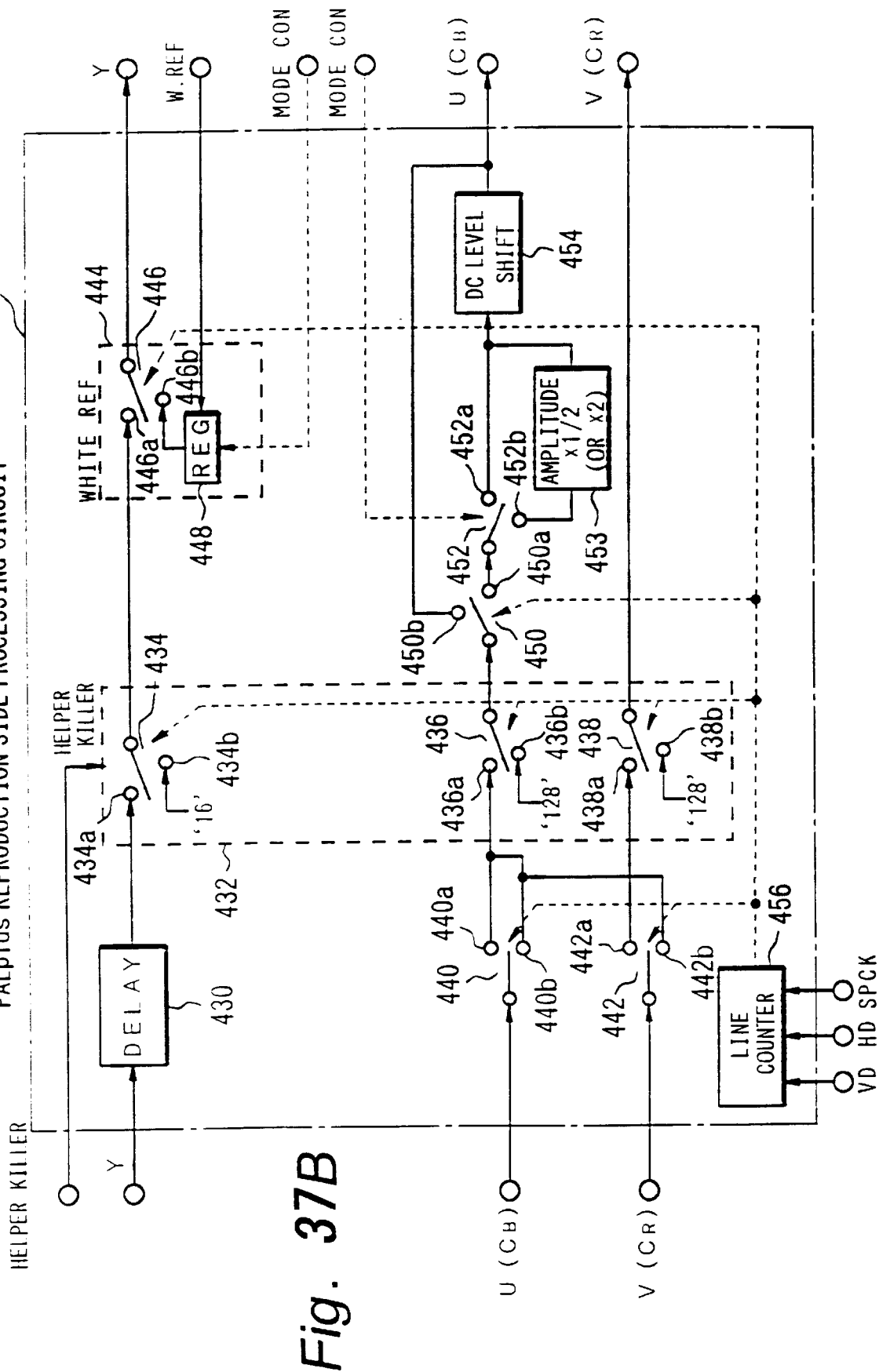
FIG. 37B is a block diagram of the PAL plus reproduction side processing circuits of FIG. 37A and 32, respectively.

The PAL plus signal reproducing circuit 300 according to the second embodiment is shown in FIGS. 37A and 37B. The reproducing side of the present invention is symmetrical to the recording side and a detailed discussion of the different aspects of the PAL plus reproducing signal circuit will be deferred to the recording section.

The digital VCR 104 outputs the luminance signal Y directly to the PAL plus reproduction side processing circuit 416 and outputs the C/HELPER signal to the line sequence interpolating circuit 414, which generates the color difference signals $C_B, C_R$ and outputs the same to the PAL plus reproduction side processing circuit 416. Thus, the 4:2:0 format of the luminance signal Y and the C/HELPER signal is converted to a 4:2:2 format ($Y:C_B:C_R$).

The white 100% reference signal is output from the controller 396 (FIG. 34) to the PAL plus reproduction side processing circuit 416. A helper killer circuit 420 outputs a helper killer signal to the PAL plus reproduction side processing circuit 416 and the WSS/reference encoder circuit 418.

The PAL plus reproduction side processing circuit 416 processes the luminance signal Y and the color difference signals $C_B, C_R$ into PAL plus signals. That is, the signals input to the PAL plus reproduction side processing circuit 416 are generated into the PAL plus video picture shown in FIG. 2A with the helper signal inserted into the upper and lower invalid screen portions and the white 100% reference signal inserted into line 623.

The helper killer signal is employed by the PAL plus reproduction side processing circuit 416 to suppress the helper signal when the television is not equipped to process the helper signal. The helper killer signal also mutes the WSS signal output from the WSS/reference encoder circuit when the television is not equipped to process a PAL plus video signal. As discussed, the WSS signal includes high-frequency components and would otherwise degrade digital processing if the television is not equipped to process PAL plus signals.

The output of the PAL plus reproduction side processing circuit 416 is sent to the digital-to-analog circuits 422a, 422b and 422c and, then, output to a PAL encoder 424; which performs PAL encoding and outputs the luminance signal Y to the switch 426 and the C/HELPER signal directly to the Y/C mixer circuit 428. The Y/C mixer circuit 428 mixes the signals and outputs a PAL plus video picture corresponding to FIG. 2A. The Y/C output terminal 429 is also provided in case the signals Y, C are sent to another system, which does not accept the signals Y and C combined.

FIG. 37B is a block diagram depicting the PAL plus reproduction side processing circuit 416 of FIG. 37A. As discussed, the video signal is converted into a PAL plus video signal. The luminance signal Y is delayed by a delay circuit 430 and output to switch 434 of the helper killer circuit 432, while the color difference signals $C_B, C_R$ are output to switches 440 and 442, respectively. During the main screen portions of the video picture, the switches 440 and 442 are set to terminals 440a and 442a, respectively, thereby outputting the color difference signals $C_B, C_R$ directly to switches 436 and 438, respectively, of the helper killer circuit 432. On the other hand, during transmission of the helper signal during the invalid screen portions, switches 440 and 442 are set to terminals 440a and 440b, respectively. Thus, during the invalid screen portions, the helper signal on either of the color difference signal lines is output to switch 436.

The luminance signal Y is output from the switch 434 of the helper killer circuit 432 to a white reference circuit 444. The white reference circuit inputs the white 100% reference signal to a register 448. During transmission of the main screen portions, the switch 446 is set to terminal 446a and the luminance signal Y is output. On the other hand, during transmission of line 623, the switch 446 is set to terminal 446b and the white 100% reference signal is output.

During transmission of the main screen portions, the color difference signal $C_R$ is output directly from the switch 438 to the output of the PAL plus reproduction side processing circuit 416. Similarly, the color difference signal $C_B$ is output through switches 436 and 450 to terminal 450b and the color difference signal $C_B$ bypasses the amplitude designating circuit 453 and the DC level shift circuit 454.

On the other hand, during transmission of the invalid screen portions, switches 440 and 442 are switched to the terminals 440a and 442a, respectively, and the helper signal is output to switch 450. Switch 450 is set to terminal 450a as well and outputs the helper signal to switch 452. If the helper signal is shifted during recording, as discussed with reference to FIG. 9C, the amplitude designating circuit 453 designates the number of bits that the helper signal needs to be shifted to generate the original helper signal. Otherwise, switch 452 is set to terminal 452a and no amplitude shifting is designated.

As in the case of the PAL plus recordation side processing circuit, the reproduction side processing circuit is controlled by a line counter 456. The line counter 456 causes the switches to output the luminance signal Y and the color difference signals $C_B, C_R$ during the main screen portions; outputs the helper signal during the invalid screen portions; and, outputs the white 100% reference signal during line 623.

The helper killer circuit 432 is also symmetrical to the killer circuit described with reference to FIG. 9C. When the helper killer mode is enabled, switches 434, 436 and 438 are switched to fixed digital values (16, 128, 128, respectively) during transmission of the invalid screen portion, i.e., the helper signal. During transmission of the main screen portions, the helper killer circuit 432 causes the luminance signal Y and the color difference signals $C_B,C_R$ to be output. When the helper killer circuit 432 is disabled, the switches 434, 436 and 438 are permanently set to terminals 434a, 436a and 438a, respectively, and the helper signal is output along with the luminance signal Y and the color difference signals $C_B,C_R$.

Figure 38:
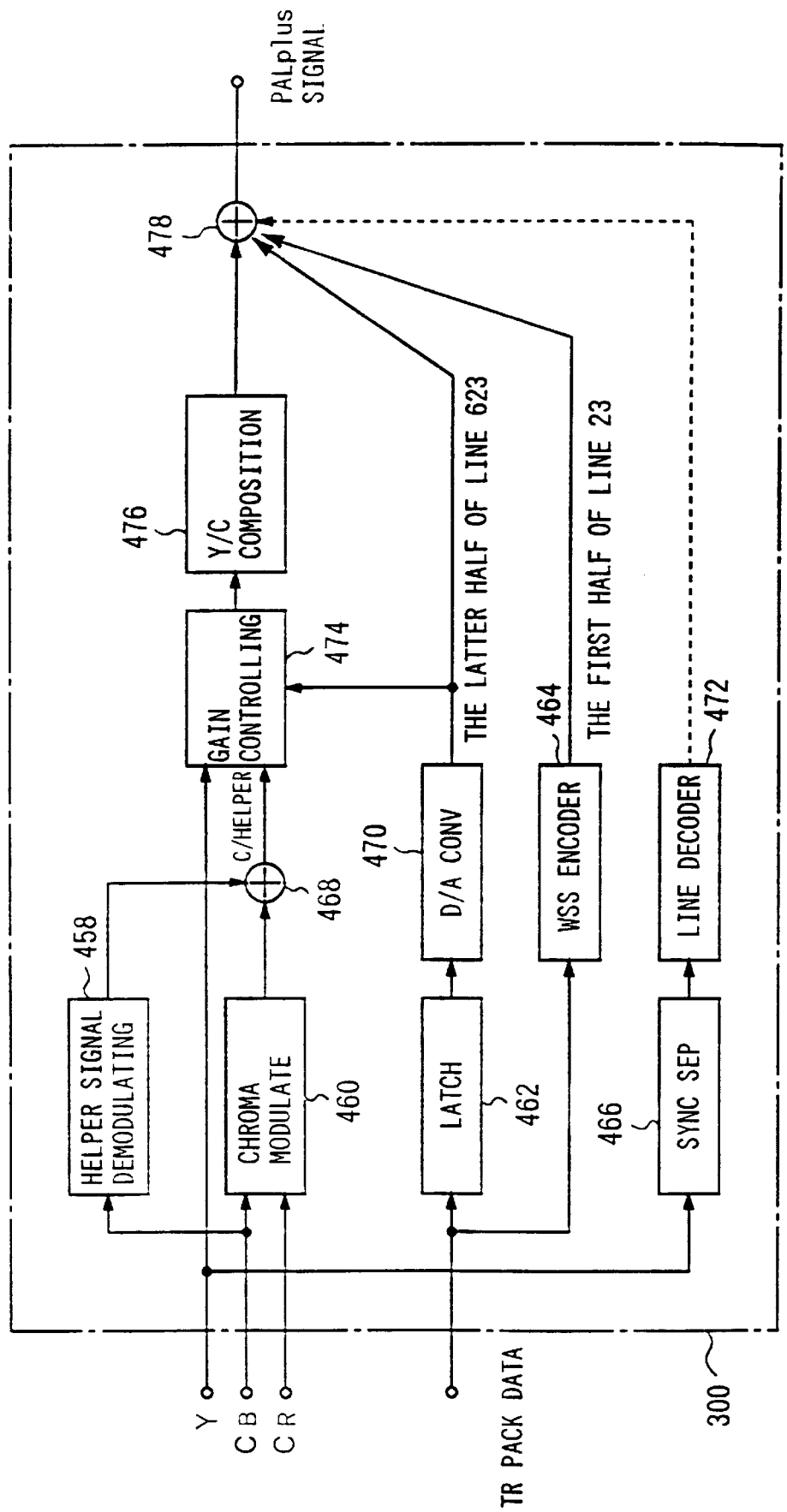
FIG. 38 is a block diagram of a PAL plus signal reproducing circuit according to the third embodiment of the present invention.

FIG. 38 is a block diagram depicting the PAL plus signal reproduction side circuit 300 according to the third embodiment of the present invention. As with the previous embodiments, the third embodiment is symmetrical with the recordation side processing circuit and a detailed description of the instant components is deferred to the recording sections.

The luminance signal Y is input to a gain controlling circuit 474 and a sync separator circuit 466. The color difference signals $C_B,C_R$ are input to a chroma modulating circuit 460, which combines the signals into a color signal C. A helper signal demodulating circuit 458 extracts the helper signal from the recorded color difference signal $C_B$ and outputs the helper signal to an adder 468 wherein the helper signal is superimposed on the color signal C line. The luminance signal Y and the C/HELPER signal is thus input to the gain controlling circuit 474, which controls the gains of the signals corresponding to the white 100% reference signal. As discussed, the white 100% reference signal is employed to reconstruct the amplitude of luminance signal Y, the color signal C and the helper signal. The amplified signals are input to a Y/C composition circuit 476, which combines the signals and outputs them to an adder 478.

The luminance signal Y sent to the sync separator circuit 466 includes horizontal and vertical sync signals. The sync separator 466 detects these sync signals and outputs the signals to a line decoder 472. The line decoder 472 generates line signals according to the sync signals and controls the adder 478.

The latch 462 latches a reproduced video signal corresponding to line 623, i.e., the white 100% reference signal, of the PAL plus video picture. The white 100% reference signal is converted to an analog signal by the digital-to-analog converting circuit 470 and output to the gain controlling circuit 474 and the adder 478.

The WSS encoder 464 retrieves the WSS signal during transmission of line 23 of the PAL plus video picture and outputs the signal to the adder 478.

The adder 478 is controlled by the line decoder 472 to output the signals of the PAL plus video picture in the order shown in FIG. 2A. Thus, the WSS signal is output during line 23. The helper signal is output during the invalid screen portions. The luminance signal Y and the color signal C are output during the main screen portion and the white 100% reference signal is output during line 623. Thus, the video signal recorded on the recording medium is reconstructed into the PAL plus video picture shown in FIG. 2A and is ready for broadcast on a PAL plus television screen.

Obviously, numerous modifications and variations of the present invention are possible in light of the above teachings. For example, the present invention may be applied to other television standards, such as EDTV-2. It is therefore to be understood that within the scope of the appended claims, the invention may be practiced otherwise than as specifically described herein.

We claim:

1. A television signal recording apparatus for recording on a record medium a composite signal that is composed of a luminance signal, a chrominance signal, and a resolution compensation signal included in predetermined television scanning lines, comprising:

Y/C separating means for separating the luminance signal and the chrominance signal from the composite signal;

decoding means for decoding the chrominance signal and luminance signal and generating color difference signals $C_B,C_R$;

combining means for combining the resolution compensation signal and one of the color difference signals $C_B,C_R$; and digital video signal recording means for digitally recording the combined resolution compensation signal and said one of the color difference signals onto the record medium.

2. The television signal recording apparatus of claim 1, wherein the composite signal is a PAL plus signal, the resolution compensation signal is a helper signal disposed in an invalid portion of the composite signal, and the decoding means is a PAL signal decoder.

3. The television signal recording apparatus of claim 2, further comprising:

WSS signal detecting means for latching a WSS signal present on a predetermined horizontal line of the PAL plus signal, wherein said WSS signal indicates a presence of the helper signal and aspect ratio information.

4. The television signal recording apparatus of claim 3, further comprising:

rewriting means for rewriting the WSS signal into a digital pack on the record medium.

5. The television signal recording apparatus of claim 4, further comprising:

means for muting the composite signal when the WSS signal is latched by the WSS signal detecting means and for preventing the predetermined horizontal line from being digitally recorded on the record medium as part of a valid portion of the PAL plus signal.

6. The television signal recording apparatus of claim 4, further comprising:

means for outputting to the combining means to be processed as a luminance signal, a reference burst signal disposed on the predetermined horizontal line of the PAL plus signal after the WSS signal.

7. The television signal recording apparatus of claim 6, further comprising:

offset adding means for adding a DC offset to the reference burst signal for recording by the digital video signal recording means.

8. The television signal recording apparatus of claim 3, further comprising:

means for storing a white reference signal disposed on a second predetermined line of the PAL plus signal in a digital pack on the record medium.

9. The television signal recording apparatus of claim 8, further comprising:

means for muting the composite signal when the white reference signal is stored in the digital pack.

10. The television signal recording apparatus of claim 8, further comprising:

helper killer means for killing the helper signal in response to a predetermined condition.

11. The television signal recording apparatus of claim 10, further comprising:

offset adding means for adding a DC offset to the helper signal for recording by the digital video signal recording means.

12. The television signal recording apparatus of claim 11, wherein the digital video signal recording means further comprises:

means for digitally compressing the composite signal into DCT coefficients to be recorded digitally on the record medium.

13. The television signal recording apparatus of claim 12, further comprising:
means for muting the composite signal corresponding to lines 60 to 62 and 372 to 374 disposed adjacent the helper signal and preventing DCT compression distortion in a main screen portion of the PAL plus signal.

14. The television signal recording apparatus of claim 11, further comprising:
line detecting means for detecting a line number of the PAL plus signal to distinguish between the helper signal, the WSS signal and useful video signals.

15. The television signal recording apparatus of claim 10, further comprising:
demodulator means for demodulating the helper signal and separating the helper signal from a subcarrier.

16. The television signal recording apparatus of claim 10, further comprising
an analog to digital converter for digitally converting the luminance signal and the color difference signals;
means for normalizing the luminance signal and the color difference signals output from the analog to digital converter; and
PAL plus processing means for processing the color difference signal output from the normalizing means before the luminance signal and the color difference signals are output to the digital video signal recording means.

17. The television signal recording apparatus of claim 16, wherein the combining means is included in the PAL plus processing means and further comprising:
a first switch having an input terminal receiving the color difference signal combined with the helper signal;
amplifying designating means for designating a gain for signal output from a first terminal of the first switch; and
offset adding means having an input connected to a second terminal of the first switch and an output of the amplifying circuit, for adding a DC offset signal to said first terminal of said first switch according to the designated gain.

18. The television signal recording apparatus of claim 17, wherein the helper killer means is included in the PAL plus processing means and further comprising:
a third switch switching between the color difference signal combined with the helper signal and a fixed digital level; and
a fourth switch switching between the other color difference signal and said fixed digital level,
wherein the helper killer means sets the third and fourth switches to the fixed digital levels when the helper killer means is enabled.

19. The television signal recording apparatus of claim 18, wherein the PAL plus processing means includes a muting circuit for muting signals on the first signal line.

20. The television signal recording apparatus of claim 1, wherein the composite signal is an EDTV-2 signal, the resolution compensation signal includes VT and VH signals disposed in an invalid portion of the composite signal, and the decoding means is an EDTV-2 decoder,
wherein the VT signal is a vertical time high band component that is lost in an interlace process and the VH signal is a vertical luminance high band component that is lost when a video signal is formed by decimation.

21. The television signal recording apparatus of claim 20, further comprising:
a demodulator for demodulating an HH signal corresponding to a horizontal luminance high band component; and
an addition circuit for adding the demodulated HH signal to one of said color difference signals.

22. The television signal recording apparatus of claim 21, further comprising:
ID signal detecting means for detecting an ID signal that indicates the presence of the VT, VH and HH signals and includes aspect ratio data, and for determining a state of the separating means based on the ID signal.

23. A television signal reproducing apparatus for converting a component signal reproduced from a record medium into a composite signal having a luminance signal, a chrominance signal and a resolution compensation signal included in a predetermined line, comprising:
digital video signal reproducing means for digitally reproducing said component signal, including one of a pair of color difference signals combined with the resolution compensation signal, from said record medium;
means for separating the resolution compensation signal from said one of the color difference signals; and
encoding means for encoding the luminance signal and the color difference signals and generating the chrominance signal from the color difference signals.

24. The television signal reproducing apparatus of claim 23, wherein said component signal is a PAL plus signal and the resolution compensation signal is a helper signal disposed in an invalid portion of the composite signal.

25. The television signal reproducing apparatus of claim 24, further comprising:
WSS signal detecting means for retrieving a digital pack including a WSS signal, corresponding to a predetermined horizontal line of the PAL plus signal, from the digital video signal reproducing means.

26. The television signal reproducing apparatus of claim 25, further comprising:
rewriting means for rewriting the WSS signal in the digital pack into said predetermined horizontal line of the PAL plus signal.

27. The television signal reproducing apparatus of claim 25, further comprising:
means for extracting a reference burst signal from the digital pack and for placing the reference burst signal onto said predetermined horizontal line of the PAL plus signal.

28. The television signal reproducing apparatus of claim 27, further comprising:
offset removing means for removing a DC offset from the extracted reference burst signal such that the extracted reference burst signal can be placed on the PAL plus signal.

29. The television signal reproducing apparatus of claim 24, further comprising:
means for retrieving a white reference signal from the digital pack and for placing the white reference level on a second predetermined horizontal line of the PAL plus signal.

30. The television signal reproducing apparatus of claim 29, further comprising:
helper killer means for killing the helper signal in response to a predetermined condition.

31. The television signal reproducing apparatus of claim 30, further comprising:

offset removing means for removing a DC offset from the helper signal such that the helper signal can be formed into the reproduced PAL plus signal.

32. The television signal reproducing apparatus of claim 31, further comprising:

means for muting the composite signal corresponding to lines 60 to 62 and 372 to 374 disposed adjacent the helper signal.

33. The television signal reproducing apparatus of claim 31, further comprising:

line detecting means for detecting a line number of the PAL plus signal to distinguish between the helper signal, the WSS signal and video signals.

34. The television signal reproducing apparatus of claim 29, further comprising:

modulator means for modulating the helper signal and combining the helper signal with a subcarrier.

35. The television signal reproducing apparatus of claim 30, further comprising:

a digital to analog converter for converting the luminance signal and the color difference signals;

means for normalizing the luminance signal and the color difference signals output from the digital video signal reproducing means; and PAL plus processing means for processing the color difference signals output from the means for normalizing.

36. The television signal reproducing apparatus of claim 35, wherein the means for combining is included in the PAL plus processing means and further comprising:

amplitude designating means receiving the combined color difference signal and the helper signal for designating a loss;

level shift means for amplifying an output of the offset removing means according to the loss;

a first switch switchable between an input of the amplitude designating means and an input of the level shift means; and a second switch switchable between an input of the first switch and an output of the level shift means, wherein, when the helper signal is present, the second switch outputs the helper signal to the helper signal is not present, the second switch bypasses the first switch.

37. The television signal reproducing apparatus of claim 36, wherein the helper killer means is included in the PAL plus processing means, and further comprising:

a third switch switching between the combined color difference signal and the helper signal and a fixed digital level; and a fourth switch switching between the other color difference signal and the fixed digital level, wherein, the third and fourth switches set the color difference signals to a fixed level when the helper killer means is enabled and the helper signal is present.

38. The television signal reproducing apparatus of claim 37, wherein the PAL plus processing means further comprises:

a white reference circuit for placing the white reference level on said second predetermined horizontal line of the PAL plus signal.

39. The television signal reproducing apparatus of claim 23, wherein the composite signal is an EDTV-2 signal and the resolution compensation signal includes VT and VH signals disposed in an invalid portion of the composite signal, wherein the VT signal is a vertical time high band component that is lost in an interlace process and the VH signal is a vertical luminance high band component that is lost when video signals are formed by decimation.

40. The television signal reproducing apparatus of claim 39, further comprising:

modulator means for modulating an HH signal corresponding to a horizontal luminance high band component; and addition means for adding the HH signal onto the EDTV-2 signal.

41. The television signal reproducing apparatus of claim 40, further comprising:

ID signal generating means for generating an ID signal to be combined with the EDTV-2 signal and to indicate a presence of the VT, VH and HH signals, said ID signal including aspect ratio data.

42. A television signal recording/reproducing method for recording and reproducing a composite signal that is composed of a luminance signal, a chrominance signal, and a resolution compensation signal included in a predetermined line, comprising the steps of:

separating the luminance signal and the chrominance signal from a received composite signal;

decoding the chrominance signal into color difference signals;

combining the resolution compensation signal with one of the color difference signals; and digitally recording the combined resolution compensation and color difference signal as a record signal on a record medium.

43. A television signal recording/reproducing method according to claim 42, further comprising the steps of:

digitally reproducing the record signal to recover said component signal from the record medium;

separating the recovered resolution compensation signal from the combined color difference signal and resolution compensation signal; and combining the recovered color difference signals into said chrominance signal.

44. The television signal recording reproducing method of claim 42, wherein the composite signal is a PAL plus signal and the resolution compensation signal is a helper signal disposed in an invalid portion of the composite signal.

45. The television signal recording/reproducing method of claim 42, wherein the composite signal is an EDTV-2 signal and the resolution compensation signal includes VT and VH signals disposed in an invalid portion of the composite signal, wherein the VT signal is a vertical time high band component that is lost in an interlace process and the VH signal is a vertical luminance high band component that is lost when video signals are formed by decimation.

* * * * *